(12) United States Patent
Kim et al.

(10) Patent No.: US 12,525,697 B2
(45) Date of Patent: Jan. 13, 2026

(54) ANTENNA CLAMPING DEVICE

(71) Applicant: KMW INC., Hwaseong-si (KR)

(72) Inventors: In Ho Kim, Yongin-si (KR); Jin Soo Yeo, Hwaseong-si (KR); Seong Man Kang, Hwaseong-si (KR); Yong Hee Han, Osan-si (KR); Hyoung Seok Yang, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 810 days.

(21) Appl. No.: 17/503,349

(22) Filed: Oct. 17, 2021

(65) Prior Publication Data

US 2022/0037758 A1    Feb. 3, 2022

Related U.S. Application Data

(63) Continuation of application No. PCT/KR2020/005214, filed on Apr. 20, 2020.

(30) Foreign Application Priority Data

Apr. 22, 2019 (KR) .................. 10-2019-0046535
Jul. 24, 2019 (KR) .................. 10-2019-0089304

(51) Int. Cl.
*H01Q 1/12* (2006.01)
*F16B 2/12* (2006.01)
(Continued)

(52) U.S. Cl.
CPC ................. *H01Q 1/12* (2013.01); *F16B 2/12* (2013.01); *F16M 11/126* (2013.01);
(Continued)

(58) Field of Classification Search
CPC ........... H01Q 1/12; F16B 2/12; F16M 11/126; F16M 11/18; F16M 11/2092; F16M 2200/022
See application file for complete search history.

(56) References Cited

U.S. PATENT DOCUMENTS

| 4,663,635 A | 5/1987 | Wu |
| 5,281,975 A | 1/1994 | Hugo |

(Continued)

FOREIGN PATENT DOCUMENTS

| CN | 2369363 Y | 3/2000 |
| CN | 202817187 U | 3/2013 |

(Continued)

OTHER PUBLICATIONS

Extended European Search Report mailed Aug. 3, 2022 for European Application No. 20794596.5.

(Continued)

*Primary Examiner* — Graham P Smith
(74) *Attorney, Agent, or Firm* — Insight Law Group, PLLC; Seung Lee

(57) ABSTRACT

Disclosed is an antenna clamping device, which includes: an arm unit which is coupled to a support pole and is partly provided to be movable in a horizontal direction; a coupling unit that is detachably mounted on a part of a tip of the arm unit; a rotation unit whose tip portion is coupled to the coupling unit so as to be ratable at a predetermined angle in a left-right direction; and a tilting unit that is coupled to a tip portion of the rotation unit so as to be tiltable in a top-down direction and mediates coupling of an antenna device, wherein an angular motion adjuster is provided on at least any one of the rotation unit and the tilting unit so as to adjust a rotating angle, thereby removing spatial limitations on a plurality of antenna devices with respect to the support pole and improving workability.

15 Claims, 15 Drawing Sheets

(51) Int. Cl.
*F16M 11/12* (2006.01)
*F16M 11/18* (2006.01)
*F16M 11/20* (2006.01)

(52) U.S. Cl.
CPC ......... *F16M 11/18* (2013.01); *F16M 11/2092* (2013.01); *F16M 2200/022* (2013.01)

(56) References Cited

U.S. PATENT DOCUMENTS

| | | | |
|---|---|---|---|
| 6,037,913 | A | 3/2000 | Johnson |
| 2005/0128154 | A1 | 6/2005 | Hately |
| 2011/0285596 | A1 | 11/2011 | Krupa |
| 2014/0028523 | A1 | 1/2014 | He |
| 2016/0211576 | A1 | 7/2016 | Vassilakis |

FOREIGN PATENT DOCUMENTS

| | | |
|---|---|---|
| CN | 105428783 A | 3/2016 |
| CN | 105514756 A | 4/2016 |
| CN | 205139183 U | 4/2016 |
| CN | 106058421 A | 10/2016 |
| CN | 207250691 U | 4/2018 |
| CN | 108336476 A | 7/2018 |
| CN | 108711666 A | 10/2018 |
| CN | 109216863 A | 1/2019 |
| CN | 212380545 U | 1/2021 |
| JP | H06-58375 A | 3/1994 |
| JP | H05-168198 A | 9/2010 |
| JP | 2013-009371 A | 1/2013 |
| JP | 2013-236378 A | 11/2013 |
| KR | 10-0184972 B1 | 5/1999 |
| KR | 20-2011-0001413 U | 2/2011 |
| KR | 20-2013-0001600 U | 3/2013 |
| KR | 10-1621892 B1 | 5/2016 |
| KR | 10-2016-0139973 A | 12/2016 |
| KR | 10-2018-0088075 A | 8/2018 |
| KR | 10-1885040 B1 | 8/2018 |
| KR | 10-2095871 B1 | 4/2020 |
| WO | 2016/181582 A | 5/2017 |

OTHER PUBLICATIONS

Japanese Office Action mailed Nov. 8, 2022 for Japanese Application No. 2021-561956.
Indian Office Action mailed Apr. 4, 2022 for Indian Application No. 202117051026.
International Search Report mailed Jul. 24, 2020 for International Application No. PCT/KR2020/005214 and its English translation.
Second Office Action mailed Apr. 24, 2024 from the Chinese Patent Office for Chinese Application No. 202080030118.2.

ANTENNA CLAMPING DEVICE

CROSS-REFERENCE TO RELATED APPLICATIONS

This application is a continuation application of International Application No. PCT/KR2020/005214, filed Apr. 20, 2020, which claims the benefit of Korean Patent Application Nos. 10-2019-0046535, filed Apr. 22, 2019, and 10-2019-0089304, filed Jul. 24, 2019, in the Korean Intellectual Property Office, the disclosures of which are incorporated herein in their entirety by reference.

TECHNICAL FIELD

The present disclosure relates to an antenna clamping device, and more particularly, to an antenna clamping device in which an antenna device can be efficiently disposed in a compact installation space as well as a direction of the antenna device is easily adjusted.

BACKGROUND ART

Wireless communication technology, for example, multiple-input multiple-output (MIMO) technology is technology that remarkably increases a data transmission capacity using multiple antennas, and is a spatial multiplexing technique for transmitting different data through each transmitting antenna at a transmitter and for sorting the transmitted data through adequate signal processing at a receiver.

Therefore, by simultaneously increasing the number of transmitting antennas and the number of receiving antennas, a channel capacity is increased, and more data can be transmitted. For example, if the number of antennas is increased to ten, a channel capacity of about ten times is secured using the same frequency band compared to a current single antenna system.

In 4G LTE-Advanced, eight antennas are used, and products in which 64 or 128 antennas are mounted in a pre-5G step are developed at present. It is expected that base station equipment having far more antennas will be used in 5G, which is referred to as Massive MIMO technology. A current cell operation is of two dimensions, whereas, if the Massive MIMO technology is introduced, 3D-Beamforming is possible, thus being also referred to as full dimension(FD)-MIMO.

In the Massive MIMO technology, as the number of antennas (ANTs) increases, the number of transmitters and the number of filters are increased together. However, due to lease expenses of an installation space or spatial limitations, RF elements(antenna/filter/power amplifier/transceiver, etc.) are actually made small, light, and inexpensive. Massive MIMO requires a high output for coverage expansion, and power consumption and a heating value caused by the high output act as negative factors in reducing weight and a size.

Especially, when a MIMO antenna, in which modules implemented by RF elements and digital elements are coupled in a layered structure, is installed in a restricted space, the necessity for compact and miniature design of a plurality of layers constituting the MIMO antenna in order to maximize installation easiness or spatial applicability is rising, and the necessity for free direction adjustment of an antenna device installed on one support pole is strongly requested.

DISCLOSURE

Technical Problem

An object of the present disclosure is to provide an antenna clamping device that can increase a degree of freedom of installation with respect to a single support pole having many spatial limitations and improve workability.

Moreover, another object of the present disclosure is to provide an antenna clamping device that can prevent a worker from getting hurt from a fall during installation of an antenna device.

In addition, yet another object of the present disclosure is to provide an antenna clamping device that easily absorbs weak vibrations due to outside installation of an antenna device, prevents generation of abnormal noises, and easily adjusts directivity.

Technical Solution

An embodiment of an antenna clamping device according to the present disclosure includes: an arm unit that is coupled to a support pole and is partly provided to be movable in a horizontal direction; a coupling unit that is detachably mounted on a part of a tip of the arm unit; a rotation unit whose tip portion is coupled to be rotatable relative to the coupling unit at a predetermined angle in a left-right direction; and a tilting unit that is coupled to the tip portion of the rotation unit so as to be tiltable in a top-down direction and mediates coupling of an antenna device, wherein an angular motion adjuster is provided on at least any one of the rotation unit and the tilting unit so as to adjust a rotating angle.

Another embodiment of an antenna clamping device according to the present disclosure includes: an arm unit that is coupled to a support pole and is partly provided to be movable in a horizontal direction; a coupling unit that is detachably mounted on a part of a tip of the arm unit; a tilting unit whose rear end is coupled to the coupling unit so as to be tiltable at a predetermined angle in a top-down direction; and a rotation. unit that is coupled to a tip portion of the tilting unit so as to be rotatable in a left-right direction and mediates coupling of an antenna device, wherein an angular motion adjuster is provided on at least any one of the rotation unit and the tilting unit so as to adjust a rotating angle.

Here, the angular motion adjuster may include at least any one of: a rotating adjustment gear set that is provided on the rotation unit and ajusts a rotating angle of the left-right direction; and a tilting adjustment gear set that is provided on the tilting unit and ajusts a tilting angle of the up-down direction.

Moreover, the angular motion adjuster may include: a worm wheel which is rotably axially coupled with a rotating shaft of the rotation unit or a tilting shaft of the tilting unit and on an outer circumferential surface of which worm wheel gear teeth are formed; and a worm which is coupled orthogonal to the rotating shaft or the tilting shaft to rotate the worm wheel and on an outer circumferential surface of which worm gear teeth meshed with the worm wheel gear teeth are formed.

Moreover, the worm may be manually driven by at least one adjustment lever cap that is provided outside the rotation unit or the tilting unit and is axially coupled with the worm.

Moreover, the worm may be automatically driven by at least one angular motion motor that is provided inside the rotation unit or the tilting unit and is axially coupled with the worm.

Moreover, the rotating adjustment gear set of the angular motion adjuster may be installed inside any one of the coupling unit and the tilting unit, and the tilting adjustment gear set of the angular motion adjuster may be installed inside the other of the coupling unit and the tilting unit.

Moreover, the coupling unit may include a tilting support block by which the tilting unit is supported, and an arm fastening block that extends from the tilting support block and is coupled to the arm unit; the tilting unit may include a rotating support block by which the rotation unit is supported, and a tilting block that extends from the rotating support block and is tiltably coupled to the coupling unit; and the rotation unit may include an antenna coupling block to which the antenna device is coupled, and a rotating block that extends from the antenna coupling block and is rotatably coupled to the tilting unit. The rotating adjustment gear set of the angular motion adjuster may be installed in an installation space of the rotating support block, and the tilting adjustment gear set of the angular motion adjuster may be installed in an installation space of the tilting support block.

Moreover, the antenna clamping device may further include angular motion preventers that are provided on the rotation unit and the tilting unit and prevent a change in angle due to vibrations or shocks caused by an external force.

Moreover, the angular motion preventers may be provided as a rotating brake washer pad provided on a rotating surface of the rotation unit and a tilting brake washer pad provided on a tilting surface of the tilting unit.

Moreover, the angular motion preventers may be provided as a pair of rotating brake washer pads interposed on the rotating shaft inside the rotation unit and a pair of tilting brake washer pads interposed on the tilting shaft inside the tilting unit.

Moreover, the coupling unit may include a tilting support block by which the tilting unit is supported, and an arm fastening block that extends from the tilting support block and is coupled to the arm unit; the tilting unit may include a rotating support block by which the rotation unit is supported, and a tilting block that extends from the rotating support block and is tiltably coupled to the coupling unit; and the rotation unit may include an antenna coupling block to which the antenna device is coupled, and a rotating block that extends from the antenna coupling block and is rotatably coupled to the tilting unit. The pair of rotating brake washer pads may be interposed on the rotating shaft that provided in an installation space of the rotating support block, and the pair of tilting brake washer pads may be interposed on the rotating shaft that is provided in an installation space of the tilting support block.

Moreover, the angular motion preventers may further include: angular motion prevention gears that are interposed on the rotating shaft or the tilting shaft, are provided to enable axial rotation, and bring the pair of rotating brake washer pads and the pair of tilting brake washer pads into close contact with each other or separate them from each other; and angular motion prevention motors that rotate the angular motion prevention gears.

Moreover, the antenna clamping device may further include a damper that is provided on any one of the rotation unit, the tilting unit and the coupling unit, is provided on an outer circumferential surface of an installation bracket on which the worm is installed in a shape of a leaf spring so as to prevent meshing of the worm with the worm wheel from being released due to vibrations or shocks caused by an external force, and elastically supports the installation bracket.

Moreover, the damper may be elastically supported on a part of an inner surface of any one of a rotating housing, a tilting housing, and a coupling housing that form appearances of the rotation unit, the tilting unit, and the coupling unit.

Moreover, the damper may include: a fixing surface that is fixed to the outer circumferential surface of the installation bracket; bent surfaces that are bent outward from the fixing surface at a predetermined angle; and elastic support surfaces that extend from the bent surfaces and come into contact with a part of an inner surface of a rotating housing, a tilting housing, a coupling housing that form appearances of the rotation unit, the tilting unit, and the coupling unit.

Moreover, the arm unit may include: a mounting arm that is disposed to be coupled to an outer circumferential surface of the support pole; a horizontal stationary arm which extends from the mounting arm at a predetermined length in a horizontal direction orthogonal to the support pole, and in which a bracket arm coupled to extend in a direction orthogonal to a lengthwise direction is provided at a tip portion thereof; and a horizontal movable arm which is coupled to the bracket arm of the horizontal stationary arm and is provided to allow a moving distance thereof to be adjusted in a lengthwise direction of the bracket arm, and to a tip portion of which the coupling unit is coupled.

Moreover, the bracket arm may include: a lower bracket that supports a lower end of the horizontal movable arm; and an upper bracket that supports an upper end of the horizontal movable arm, wherein at least one guide roller for preventing a friction during movement of the horizontal movable arm may be provided at a diagonal portion of an internal space defined by the lower bracket and the upper bracket.

Moreover, the horizontal movable arm may have multiple fixing holes drilled up and down; at least one or more fixing pin holes matched with the multiple fixing holes may be formed in the bracket arm, and the horizontal movable arm may be fixed by a fixing pin that passes through any one of the at least one or more fixing pin holes and passes through any one of the multiple fixing holes.

In addition, a movement adjusting handle may be provided at a tip portion of the horizontal movable arm.

Advantageous Effects

An embodiment of the antenna clamping device according to the present disclosure can achieve the following various effects.

First, an arm unit is manufactured in various lengths and is installed, and thereby spatial layout design of multiple antenna devices installed on one support pole is easy.

Second, tilting and rotating motions of the antenna device are facilitated through a tilting unit and a rotation unit, and thus workability and frequency yield performance of the antenna device can be improved.

Figure 1:
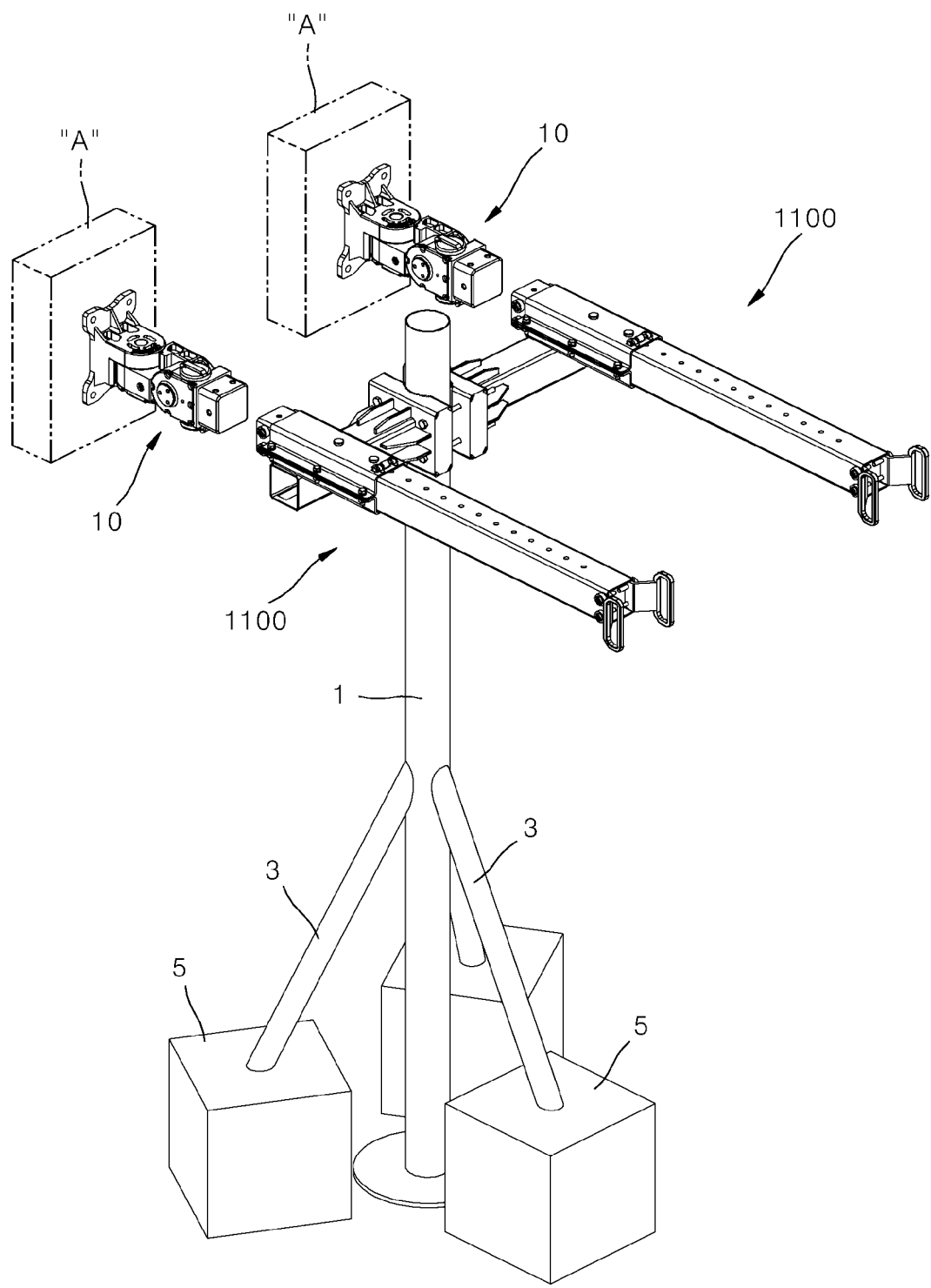
FIG. 1 is a perspective view illustrating an example in which an antenna clamping device according to the present disclosure is installed.

1: support pole 3: multiple support rods
5: support block 10, 10', 10": clamping assembly
30: coupling unit 100: tilting unit
200: rotation unit 250: rotating adjustment gear set
350: tilting adjustment gear set 1100: arm unt

BEST MODE

Hereinafter, an embodiment of an antenna clamping device according to the present disclosure will be described in detail with reference to the accompanying drawings. In adding reference numerals to the elements of each drawing, it should be noted that the same elements have the same reference numerals as much as possible even if they are displayed in different drawings. Moreover, in describing embodiments of the present disclosure, when it is determined that a detailed description of the related well-known configuration or function hinders understanding of an embodiment of the present disclosure, the detailed description thereof will be omitted.

Furthermore, in describing elements of an embodiment of the present disclosure, terms, such as a first, a second, A, B, (a), and (b), may be used. Such terms are used only to distinguish one component from the other component, and the essence, order, or sequence of a corresponding component is not limited by the terms. All terms used herein, including technical or scientific terms, have the same meanings as those commonly understood by a person having ordinary knowledge in the art to which the present disclosure pertains, unless defined otherwise in the specification. Terms, such as those commonly used and defined in dictionaries, should be construed as having the same meanings as those in the context of a related technology, and are not construed as being ideal or excessively formal unless explicitly defined otherwise in the specification.

Figure 2:
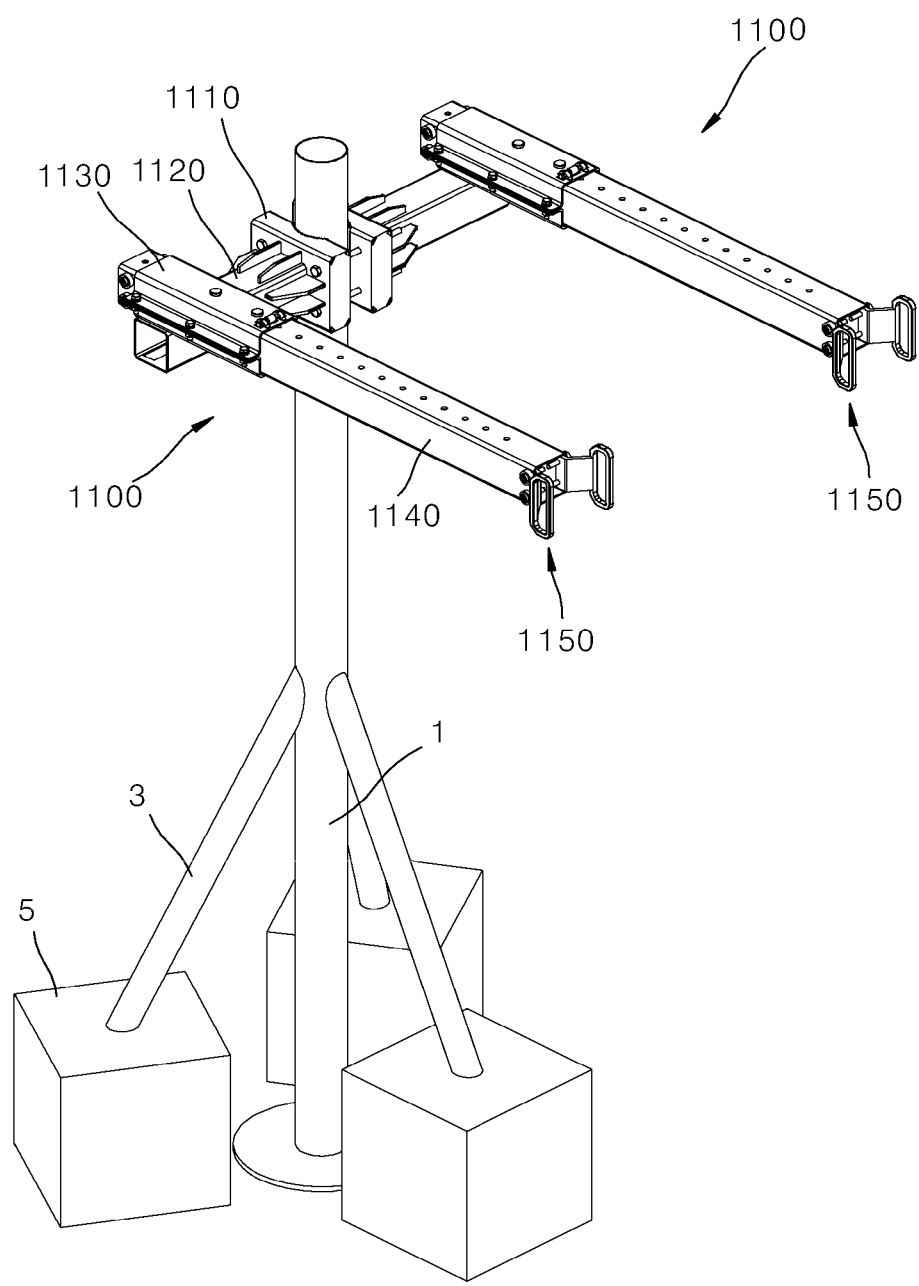
FIG. 2 is a perspective view illustrating an arm unit among the components of FIG. 1.
Figure 3:
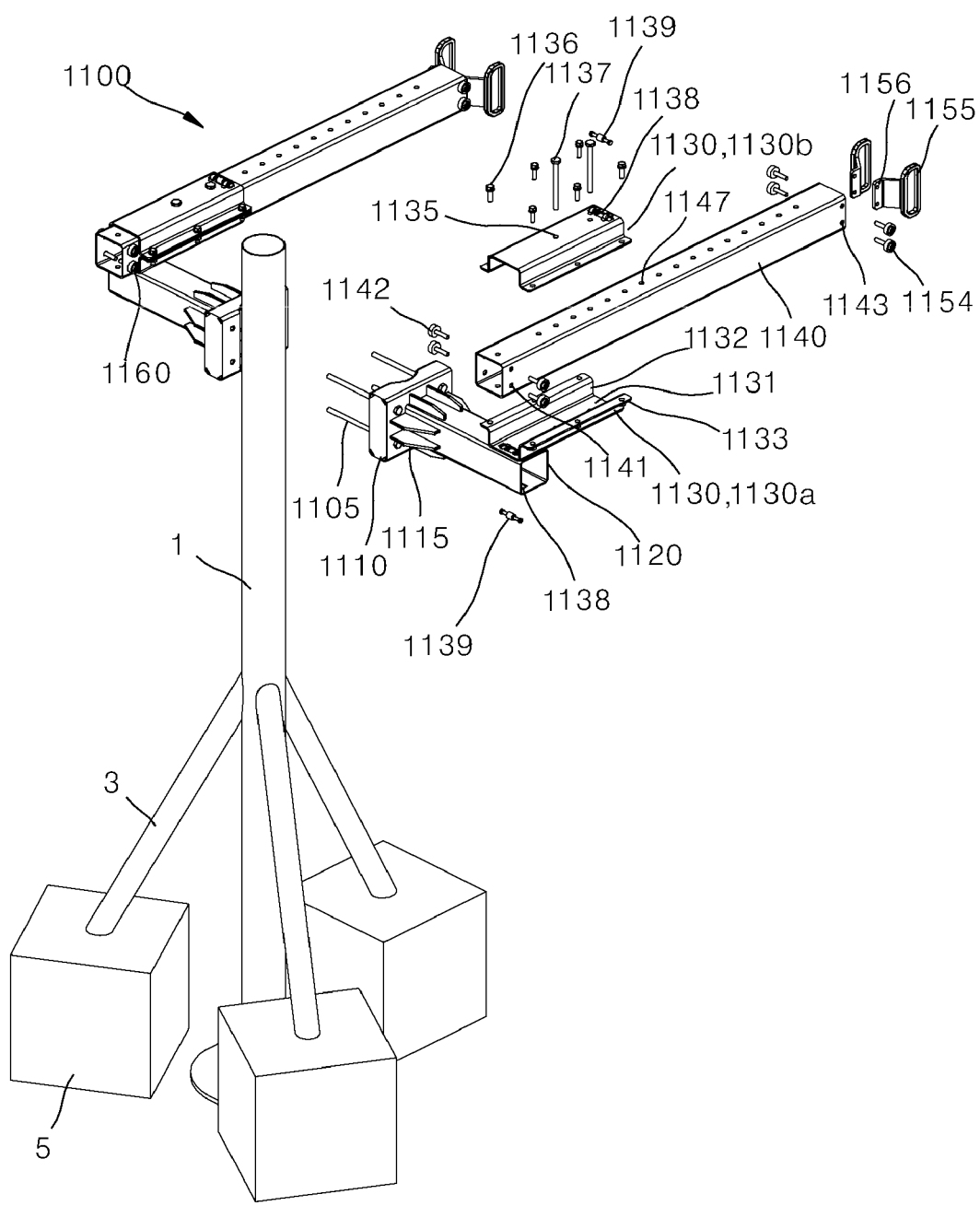
FIG. 3 is an exploded perspective view of FIG. 2.

FIG. 1 is a perspective view illustrating an example in which an antenna clamping device according to the present disclosure is installed. FIG. 2 is a perspective view illustrating an arm unit among the components of FIG. 1. FIG. 3 is an exploded perspective view of FIG. 2.

Referring to FIGS. 1 to 3, an embodiment of an antenna clamping device 10 according to the present disclosure includes an arm unit 1100 that is coupled to a support pole 1, a coupling unit 30 that is coupled with the arm unit 1100, a tilting unit 100 that is coupled to the coupling unit 30 so as to be tiltable in an up-down direction, and a rotation unit 200 which is coupled to the tilting unit 100 so as to be rotatable in a left-right direction and to which an antenna device A is coupled.

Here, the support pole 1 may be further provided with multiple support rods 3 that slantly extend downward from an outer circumferential surface of an lower end of the support pole 1 and are radially spaced apart from one another at a predetermined angle, and support blocks 5 that are provided at lower ends of the multiple support rods 3 and are supported and coupled to a ground or a wall of an installation place.

The multiple support rods 3 may not only be integrally formed on the outer circumferential surface of the support pole 1 by a welding method, but also be separately manufactured to be coupled to the support pole 1 by various coupling methods such as a bolting method. At least three multiple support rods 3 may be provided to be able to three-dimensionally firmly support the support pole 1, which is installed in an up-down direction or in a left-right direction, in three or more places.

Moreover, each of the support blocks 5 serves as a weight (or a heavy body) that stably places the support pole 1 on the ground (the bottom) of the installation place, but is not necessarily provided in a block shape. Although not illustrated in the drawings, the support blocks 5 may be provided in a panel shape in which bolt fastening holes (not illustrated) are formed so as to be firmly coupled to the ground (the bottom) or the wall using fastening members such as bolts.

Meanwhile, the arm unit 1100 serves to mediate coupling of the antenna device A to the support pole 1. The arm unit 1100 may be substantially coupled to one side and the other side of the outer circumferential surface of the single support pole 1 by a bolting method, and may be formed in such a way as to extend to one side or the other side in a horizontal direction or one side and the other side in a horizontal direction orthogonal to a lengthwise direction of the support pole 1 at a predetermined length and to be installed such that the antenna device A is spaced apart from the support pole 1 by a predetermined length. At least one arm unit 1100 is coupled to the support pole 1 in the shape of a single beam, and serves to make it possible to install multiple antenna devices A.

Furthermore, referring to FIGS. 1 to 3, when the antenna device A is installed, the arm unit 1100 is provided to be partly moved forward or backward in a horizontal direction with the antenna device A installed, and thereby a separation distance of the antenna device A from the support pole 1 can be adjusted.

More specifically, referring to FIGS. 1 to 3, the arm unit 1100 may include a horizontal stationary arm 1120 that is coupled to the support pole 1 and extends at a predetermined length in a horizontal direction, i.e. in at least any one of leftward and rightward directions (in left and right opposite directions in the case of the present embodiment), a bracket arm 1130 that is coupled to extend in a direction orthogonal to a tip portion of the horizontal stationary arm 1120, and a horizontal movable arm 1140 that is provided to allow a moving distance thereof to be adjusted with respect to the bracket arm 1130 in a lengthwise direction of the bracket arm 1130.

A mounting block 1110, which mediates coupling to the support pole 1, may be formed at one end of the horizontal stationary arm 1120 which is adjacent to the support pole 1. In the case where the horizontal stationary arm 1120 is provided at the opposite side of the support pole 1, a pair of horizontal stationary arms 1120 may be mutually fixed by multiple fixing bolts 1105 that are fastened across the mounting blocks 1110 provided to be opposite to each other at the left and right sides of the outer circumferential surface of the support pole 1. If one of the horizontal stationary arms 1120 is provided only at any one of the left and right sides of the support pole 1, the other horizontal stationary arm 1120 may be coupled at the other side of the outer circumferential surface of the support pole 1 opposite to one of the mounting blocks 1110 using the other demountable mounting block (not illustrated) corresponding to a shape of one mounting block 1110.

A connection portion between the mounting block 1110 and the horizontal stationary arm 1120 may be connected for reinforcement by multiple reinforcement ribs 1115 so as to withstand a moment according to weight. The multiple reinforcement ribs 1115 may be provided to mutually connect an outer surface of the mounting block 1110 and an outer surface of the horizontal stationary arm 1120 by a welding method.

The horizontal stationary arm 1120 is provided in the shape of a hollow pipe having an approximately quadrilateral vertical cross section, and is preferably provided to have stiffness enough to withstand weight of the bracket arm 1130, the horizontal movable arm 1140, the coupling unit 30, a clamping assembly 10, and the antenna device A, all of which will be at least described below.

Referring to FIG. 3, the bracket arm 1130 may include a lower bracket 1130*a* that supports a lower end of the horizontal movable arm 1140, and an upper bracket 1130*b* that supports an upper end of the horizontal movable arm 1140.

The lower bracket 1130*a* or the upper bracket 1130*b* includes a horizontal support flange 1131 that supports a lower or upper surface of the horizontal stationary arm 1120, vertical support flanges 1132 that extend upward from left and right opposite ends of the horizontal support flange 1131 at a predetermined length, and coupling flanges 1133 that extend outward from upper ends of the vertical support flanges 1132 in the leftward and rightward directions at a predetermined length. The coupling flanges 1133 of the lower bracket 1130*a* and the coupling flanges 1133 of the upper bracket 1130*b* may be each provided with multiple fastening holes 1134 to which multiple fastening screws 1136 are through-fastened.

A lower surface of a front end of the lower bracket 1130*a* may come into close contact with and be fixed to an upper surface of the tip portion of the horizontal stationary arm 1120 by a welding method or a bolting method.

When the upper bracket 1130*b* is fastened at an upper side of the lower bracket 1130*a* by the multiple fastening screws 1136 fastened through the fastening holes 1134 of the coupling flanges 1133, an internal space corresponding to an outline of a vertical cross section of the horizontal movable arm 1140 can be formed.

When the horizontal movable arm 1140 is linearly moved between the lower bracket 1130*a* and the upper bracket 1130*b* in a front-rear direction, the bracket arm 1130 may serve to guide the linear movement.

Furthermore, at least one guide roller 1139 for preventing a friction during movement of the horizontal movable arm 1140 may be provided at a diagonal portion of the internal space defined by the lower bracket 1130*a* and the upper bracket 1130*b*. The guide roller 1139 may be fixed and installed in a roller installation slot 1138 provided in the corresponding portion of the lower bracket 1130*a* or the upper bracket 1130*b*.

More specifically, the clamping assembly 10 is installed on a tip portion of the horizontal movable arm 1140 in a state in which the horizontal movable arm 1140 is eccentrically projected to one side of the bracket arm 1130 in a single beam shape. The center of gravity of the horizontal movable arm 1140 leans to one side, and thus a predetermined frictional force is generated between an inner surface of the bracket arm 1130 and an outer surface of the horizontal movable arm 1140. Thereby, a problem that the horizontal movable arm 1140 is not easily moved and a moving distance thereof is not easily adjusted may occur.

The at least one guide roller 1139 is provided to support an upper surface of the horizontal movable arm 1140 at a rear end of the upper bracket 1130*b* or to support a lower surface of the horizontal movable arm 1140 at a front end of the lower bracket 1130*a*, thereby serving to minimize a frictional force to facilitate work when the moving distance of the horizontal movable arm 1140 is adjusted by a worker.

Meanwhile, the horizontal movable arm 1140 is provided with multiple fixing holes 1147 that are penetrated up and down. At least one or more fixing pin holes 1135 matched with the multiple fixing holes 1147 are formed in the bracket arm 1130. The horizontal movable arm 1140 may be fixed by at least one fixing pin 1137 that passes through the at least one or more fixing pin holes 1135 and then any one of the multiple fixing holes 1147.

In this way, when fixed by the fixing pin 1137, the horizontal movable arm 1140 cannot be any more linearly moved relative to the bracket arm 1130, and thus a separation distance of the antenna device A from the support pole 1 can be firmly fixed.

Meanwhile, a movement adjusting handle 1150 may be provided at a tip portion of the horizontal movable arm 1140. The movement adjusting handle 1150 may be firmly fixed by an operation in which fastening screws 1154 coupled to screwing holes 1143 formed in the tip portion of the horizontal movable arm 1140 are through-fastened to screw through-holes 1156 of the movement adjusting handle 1150.

Here, a worker can usually pull the movement adjusting handle 1150 of the horizontal movable arm 1140, which is previously installed on the support pole 1 in a rooftop or guardrail area of a building, in a direction in which a space where installation of the antenna device A is safe is provided, move an end of the horizontal movable arm 1140 at which the clamping assembly 10 is installed, and install the horizontal movable arm 1140.

In this case, it is preferred that the worker somewhat loosely releases the fastening screws 1136, which mutually fasten the lower bracket 1130*a* and the upper bracket 1130*b* of the bracket arm 1130, from the fastening holes 1134, pulls the horizontal movable arm 1140 using the movement adjusting handle 1150, moves the horizontal movable arm 1140 in a direction in which installation work is safe, and performs installation work of the clamping assembly 10 and installation work of the antenna device A.

Figure 4:
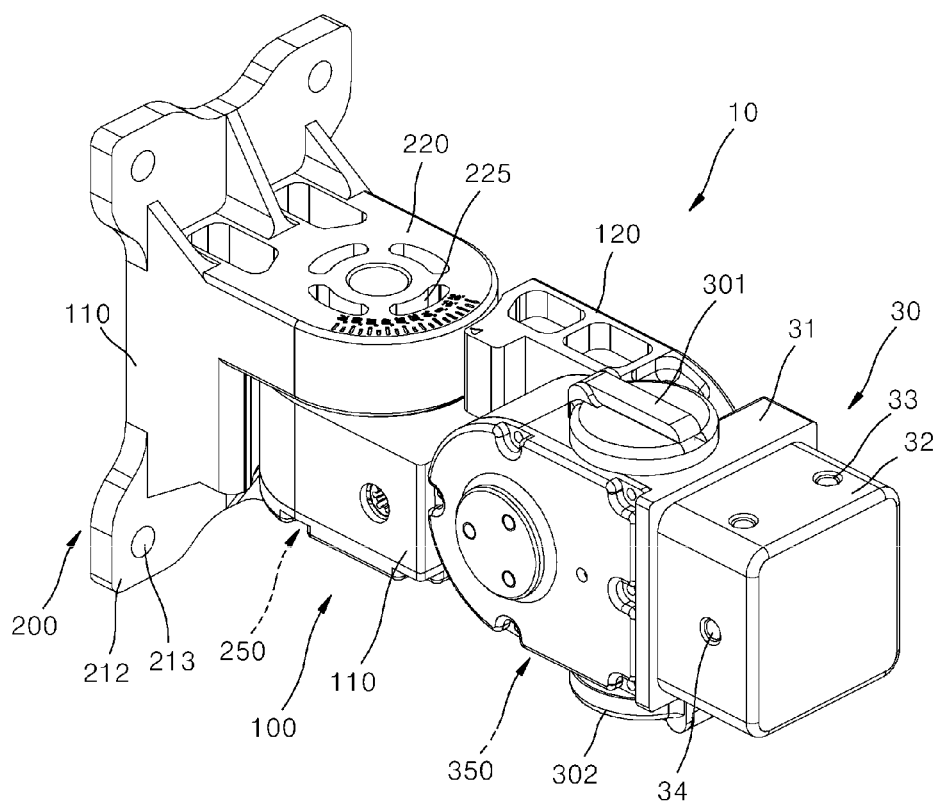
FIG. 4 is a perspective view illustrating an embodiment of an antenna clamping device according to the present disclosure.
Figure 5:
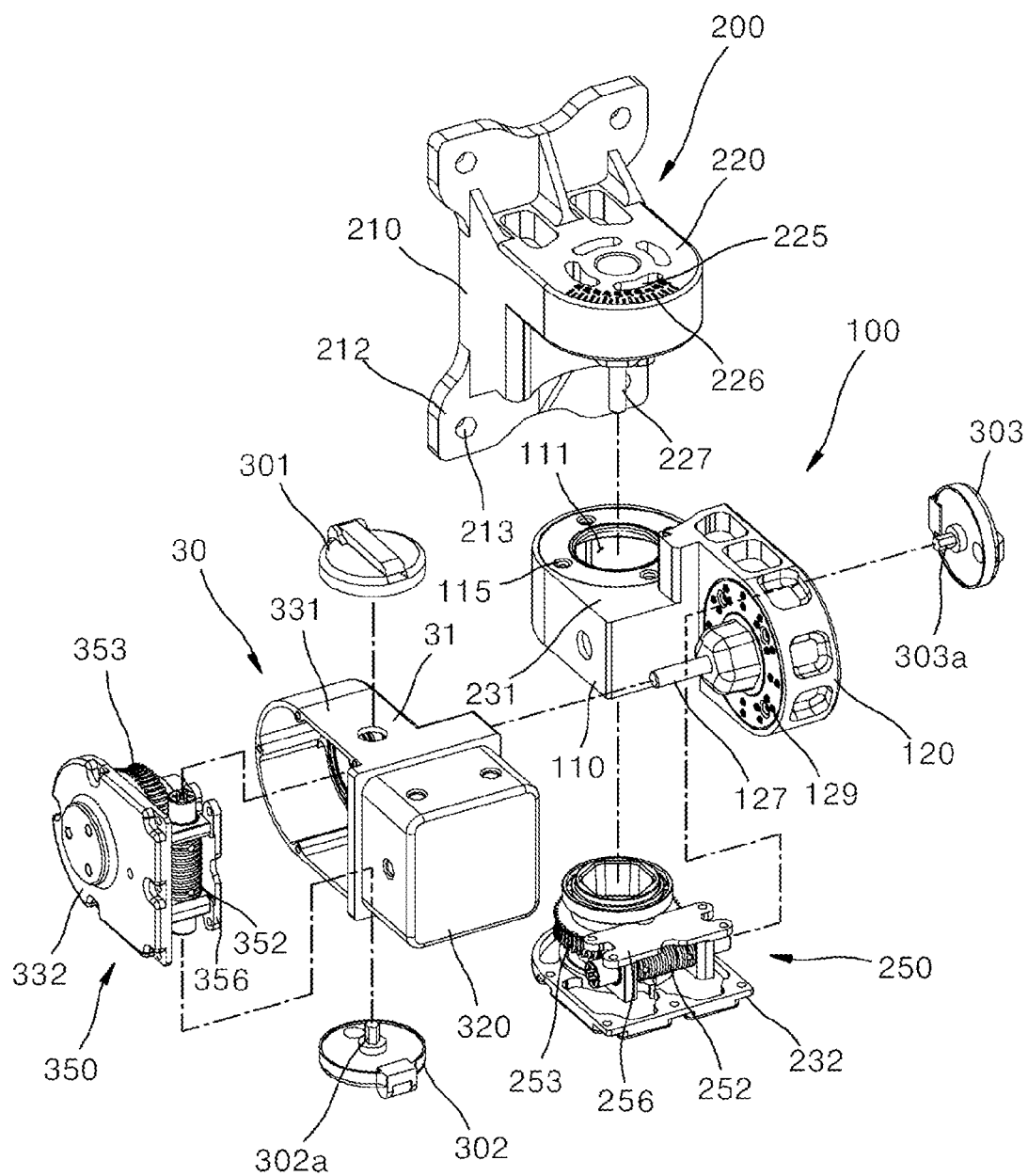
FIG. 5 is an exploded perspective view of FIG. 4.

FIG. 4 is a perspective view illustrating an embodiment of an antenna clamping device according to the present disclosure, and FIG. 5 is an exploded perspective view of FIG. 4.

As will be described below, the clamping assembly 10, 10' or 10" implemented by various embodiments may be installed on the tip portion of the arm unit 1100. The clamping assembly 10, 10' or 10" not only mediates installation of the antenna device A but also is rotatably or tiltably provided to set directivity of the antenna device A, and thus may be a configuration concept that is commonly defined as the tilting unit 100 and the rotation unit 200 that are described above.

More specifically, in the antenna clamping device according to an embodiment of the present disclosure, the clamping assembly 10 may include the tilting unit 100 that is coupled via the coupling unit 30 coupled to the tip portion of the arm unit 1100, and the rotation unit 200 that is coupled to the tilting unit 100.

Especially, referring to FIGS. 4 and 5, the rotation unit 200 may include an antenna coupling block 210, at coners of which bolting flanges 212, which have bolting holes 213 to which each of the antenna devices A is bolted in the front of the antenna coupling block 210, are provided, and a rotating block 220 that extends from the antenna coupling block 210 to one side (especially, a rear side) thereof.

The antenna coupling block 210 and the rotating block 220 are merely distinguished for convenience of description, and each of the rotation units 200 is naturally configured such that the antenna coupling block 210 and the rotating block 220 may be integrally formed.

Referring to FIG. 4, the antenna coupling block 210 is a portion to which each of the antenna devices A is substantially mounted and fixed, and may be provided in the shape of a quadrilateral panel having flat vertical surfaces. The flanges 212 provided at the corner of the antenna coupling block 210 may protrude outward at a predetermined length. Here, the antenna fastening holes 213 provided in the flanges 212 are drilled in a front-rear direction, and each of the antenna devices A may be firmly fixed to the antenna coupling block 210 by fixing screws (not illustrated) fastened through the antenna fastening holes 213.

The rotating block 220 has a rotating shaft 227 inserted into and coupled to a shaft hole 111 provided on each of the tilting units 100 (to be described below), and the rotating shaft 227 serves as the center of a rotating motion of each of the rotation units 200 in a left-right direction.

Furthermore, the rotating block 220 has rotating guide slots 225 through which rotating guide bolts (not illustrated) pass, and a rotating angle label 226 may be printed or attached to an outer surface of the rotating block 220.

The rotating guide bolts may be fastened to multiple guide bolt fastening holes 115 formed in a portion of the tilting unit 100 (see an upper surface of a rotating support block 110 (to be described below)) which comes into surface contact with a lower surface of the rotating block 220 so as to be exposed upward. An upper end of the rotating guide bolt is inserted into the rotating guide slot 225, and can guide rotation of the rotation unit 200 in a left-right direction and restrict a rotating amount thereof. A worker can visually recognize a rotating amount of the antenna device A through the rotating angle label 226, and fix the rotating block 220 at an accurate position.

Meanwhile, referring to FIGS. 4 and 5, the tilting unit 100 may include a rotating support block 110 in which the shaft hole 111, to which the rotating shaft 227 of the rotating block 220 is coupled, is formed and which rotatably supports a lower end face of the rotating block 220, and a tilting block 120 that extends from the rotating support block 110 and is tiltably coupled to the coupling unit 30 (to be described below).

The rotating support block 110 and the tilting block 120 may be integrally formed, and an installation space in which any one 250 of angular motion adjusters 250 and 350 (to be described below) is installed may be formed inside the rotating support block 110. More specifically, the tilting unit 100 may include a tilting housing 231 in which the above installation space is formed, and a tilting cover housing 232 that is coupled to a lower side of the tilting housing 231 so as to cover the installation apace.

One lateral surface of the tilting block 120 is coupled to come into surface contact with one lateral surface of the coupling unit 30 (to be described below), and is provided with a tilting shaft 127 so as to extend toward the coupling unit 30 in a lateral direction. A shaft hole (not illustrated) through which the tilting shaft 127 passes may be formed in the coupling unit 30. The tilting shaft 127 may be connected to the angular motion adjuster 350 (to be described below).

Meanwhile, a rotating brake washer pad (not illustrated), which forms a mutual frictional force to prevent arbitrary rotation caused by an arbitrary external force, may be provided at a surface contact portion between the rotating support block 110 and the above-described rotating block 220, and a tilting brake washer pad 129, which forms a mutual frictional force to prevent arbitrary rotation caused by an arbitrary external force, may be provided at a surface contact portion between the tilting block 120 and the coupling unit 30 (to be described below). Here, the rotating brake washer pad and the tilting brake washer pad 129 may be defined as angular motion preventers that prevent arbitrary rotation of the rotation unit 200 and the tilting unit 100.

Furthermore, the coupling unit 30 may include a tilting support block 31 to which the tilting block 120 is fastened in close contact, and an arm fastening block 32 that extends from the tilting support block 31 and is coupled to the arm unit 1100.

The tilting support block 31 and the arm fastening block 32 may be integrally formed, and an installation space, in which any one 350 of the angular motion adjusters 250 and 350 (to be described below) is installed, may be formed inside one side of the tilting support block 31. More specifically, the coupling unit 30 may include a coupling housing 331 in which the above installation space is formed, and a coupling cover housing 332 that is coupled to one side of the coupling housing 331 so as to cover the installation apace.

The arm fastening block 32 is inserted into a mounting space (not illustrated) provided in the tip portion of the arm unit 1100, and multiple bolting holes 33 and 34, which are fastened through fastening members such as bolts (see a reference numeral 142 of FIG. 3) may be formed in the arm fastening block 32.

In this way, the clamping assembly 10 according to the present disclosure is provided to enable the antenna device A to be tilted in an up-down direction as the tilting unit 100 is coupled via the coupling unit 30 so as to be tiltable about the tilting shaft 127 in an up-down direction, and can tilt the antenna device A in an up-down or left-right direction to adjust directivity as the rotation unit 200 is coupled to the tilting unit 100 so as to be rotatable about the rotating shaft 227 in a left-right direction.

Here, referring to FIG. 5, the clamping assembly 10 according to the present disclosure may further include the angular motion adjuster 250 that is installed in the installation space of the rotating support block 110 of the tilting unit 100 so as to enable a rotating motion of the rotation unit 200, or the angular motion adjuster 350 that is installed in the installation space of the tilting support block 31 of the coupling unit 30 so as to enable a tilting motion of the tilting unit 100.

More specifically, referring to FIG. 5, the angular motion adjuster 250 may include a rotating adjustment gear set 250 that is installed in the installation space of the rotating support block 110 among the components of the tilting unit 100 and adjusts the rotating motion of the rotation unit 200, and the angular motion adjuster 350 may include a tilting adjustment gear set 350 that is installed in the installation space of the tilting support block 31 among the components of the coupling unit 30 and adjusts the tilting motion of the tilting unit 100.

Referring to FIG. 5, in the antenna clamping device according to an embodiment of the present disclosure, it is disclosed that both the rotating adjustment gear set 250 and the tilting adjustment gear set 350 capable of adjusting an angular motion of the rotation unit 200 and an angular motion of the tilting unit 100 are provided, but both the rotating adjustment gear set 250 and the tilting adjustment gear set 350 are not necessarily provided. For example, as in an antenna clamping device (see FIGS. 6 and 7) according to another embodiment of the present disclosure (to be described below), only the tilting adjustment gear set 350 that adjusts the tilting motion of the tilting unit 100 may be naturally provided, which will be described below in greater detail.

As will be described below, the rotating adjustment gear set 250 and the tilting adjustment gear set 350 have the same configuration. Hereinafter, only the rotating adjustment gear set 250 will be representatively described, and description of the tilting adjustment gear set 350 will be replaced with description of the corresponding components and will be omitted.

Referring to FIG. 5, the rotating adjustment gear set 250 is installed via the tilting cover housing 232 that covers an interior of the installation space of the rotating support block 110.

More specifically, the rotating adjustment gear set 250 includes a worm 252 that is installed on a worm bracket 256 fixed to the tilting cover housing 232, and a worm wheel 253 that is provided to be meshed with the worm 253. Here, when the worm wheel 253 is axially coupled with the rotating shaft 227, is meshed with the worm 252, and is rotated, the rotating shaft 227 rotates the rotation unit 200 in a left-right direction while being rotated.

Meanwhile, a rotating adjustment cap 303 having a cap shaft 303a axially coupled with the worm 252 may be coupled outside the worm 252 in an axial direction (i.e., outside the rotating support block 110).

Therefore, a worker manually operates the rotating adjustment cap 303 from the outside, and thereby can manually rotate the rotation unit 200 through the worm 252 and the worm wheel 253 in turn. That is, when electrical driving of the rotating adjustment gear set 250 provided in the installation space of the tilting unit 100 is difficult, the rotating adjustment cap 303 is to enable the worker to manually adjust directivity of the antenna device A.

Next, the tilting adjustment gear set 350 has the same configuration except connection of the tilting shaft 127 and a worm wheel 353, and thus detailed description thereof is replaced with the description of the related figure (FIG. 5). However, the tilting adjustment gear set 350 is different in that tilting adjustment caps 301 and 302 are axially coupled to one end and the other end of a worm 352 via a cap shaft 302a.

Figure 6:
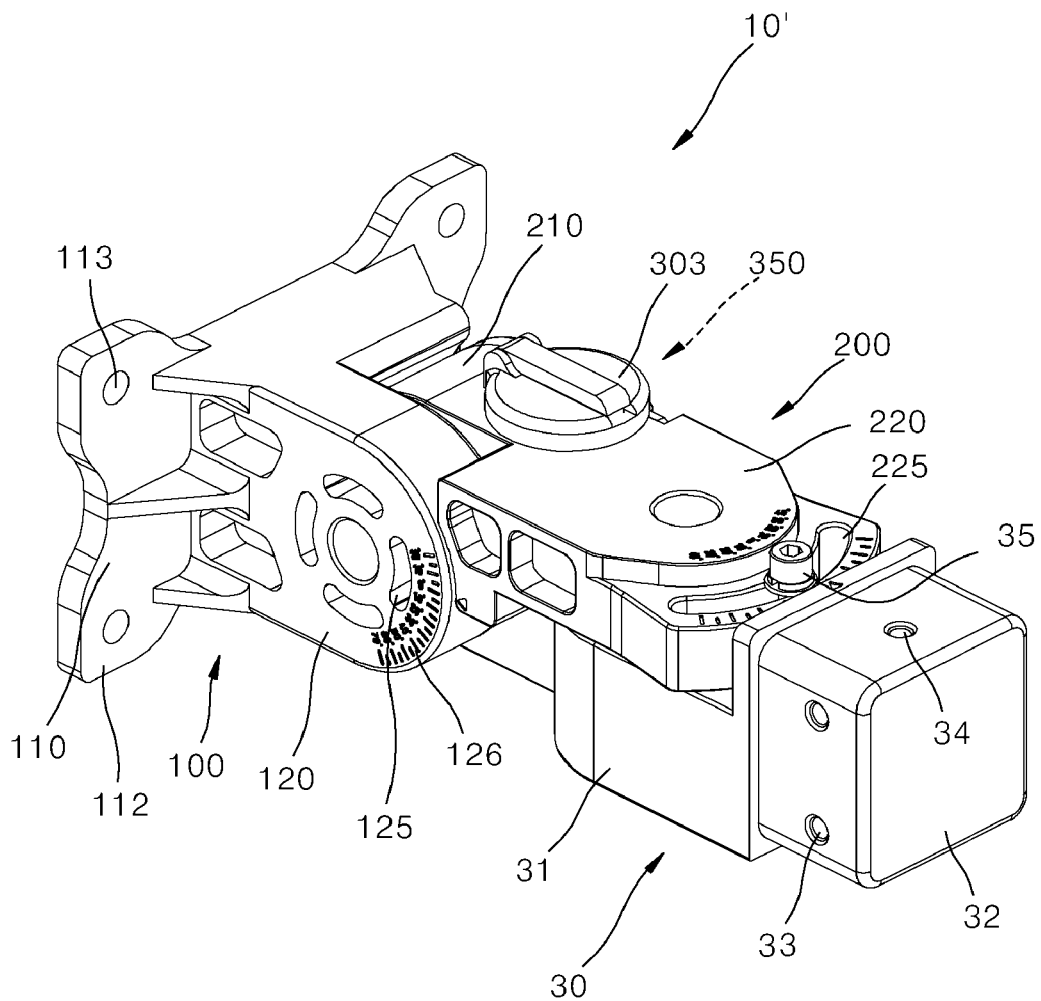
FIG. 6 is a perspective view illustrating another embodiment of an antenna clamping device according to the present disclosure.
Figure 7:
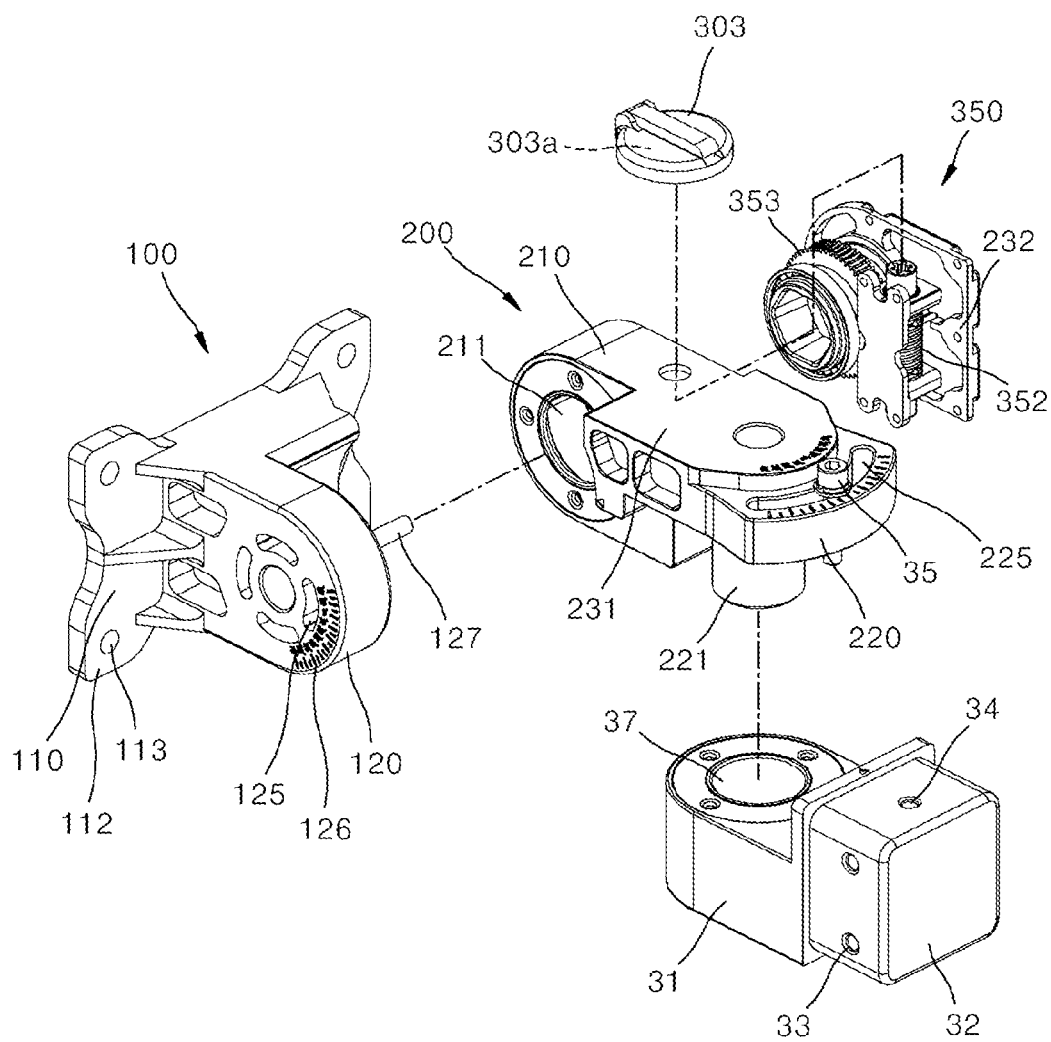
FIG. 7 is an exploded perspective view of FIG. 6.

FIG. 6 is a perspective view illustrating another embodiment of an antenna clamping device according to the present disclosure, and FIG. 7 is an exploded perspective view of FIG. 6.

The antenna clamping device according to an embodiment of the present disclosure which is described through FIGS. 4 and 5 is described as an embodiment in which the tilting unit 100 is coupled to the coupling unit 30, the rotation unit 200 is coupled to the tilting unit 100, and the antenna device A is mounted on the rotation unit 200.

However, another embodiment (to be described below) of the antenna clamping device according to the present disclosure may be configured such that, referring to FIGS. 6 and 7, the rotation unit 200 is installed on a front end of the coupling unit 30 so as to be rotatable in a left-right direction, the tilting unit 100 is installed on a front end of the rotation unit 200 so as to be tiltable in an up-down direction, and the antenna device A is mounted on the tilting unit 100 through bolting holes 113 of the bolting flanges 112 of the tilting unit 100.

The tilting motion and the rotating motion have only a difference based on the result that an angular motion centering on a position at which the antenna device A is installed in an up-down direction is defined as "tilting" and an angular motion centering on a position at which the antenna device A is installed in a left-right direction is defined as "rotating." Thus, the antenna clamping device 10' according to another embodiment of the present disclosure merely has a difference from an embodiment in which the antenna clamping device 10 according to an embodiment of the present disclosure is rotated at an angle of 90 degrees.

However, as described above, the angular motion adjusters should not be provided on both the tilting unit 100 and the rotation unit 200, and referring to FIG. 7, the tilting adjustment gear set 350 can be provided only on the tilting unit 100.

A specific configuration and coupling relationship of the tilting adjustment gear set 350 are replaced with the description of the tilting adjustment gear set 350 among the components of the antenna clamping device 10 according to an embodiment of the present disclosure which is described above.

In this way, the reason why the angular motion adjuster is provided only on the tilting unit 100 is because, with the result that the antenna device A is installed in, for instance, a windy external environment in addition to a dead load of the antenna device A, it is further feared that the tilting unit 100 is arbitrarily tilted up and down by weak vibrations transmitted from the outside. That is, the rotation unit 200 is less influenced by the dead load of the antenna device A, and thus room for an arbitrary angular motion is reduced compared to the tilting unit 100.

Here, the tilting adjustment gear set 250 performs an additional function as the angular motion preventer for preventing an arbitrary angular motion caused by weak vibrations due to the meshing of the worm 252 and the worm wheel 253 in addition to a function of simply adjusting the tilting motion of the tilting unit 100. This can be more easily understood from a new form implemented by adding a component as a separate angular motion preventer in the antenna clamping device according to another embodiment of the present disclosure which will be described with reference to FIGS. 8 to 10B (to be described below).

Figure 8:
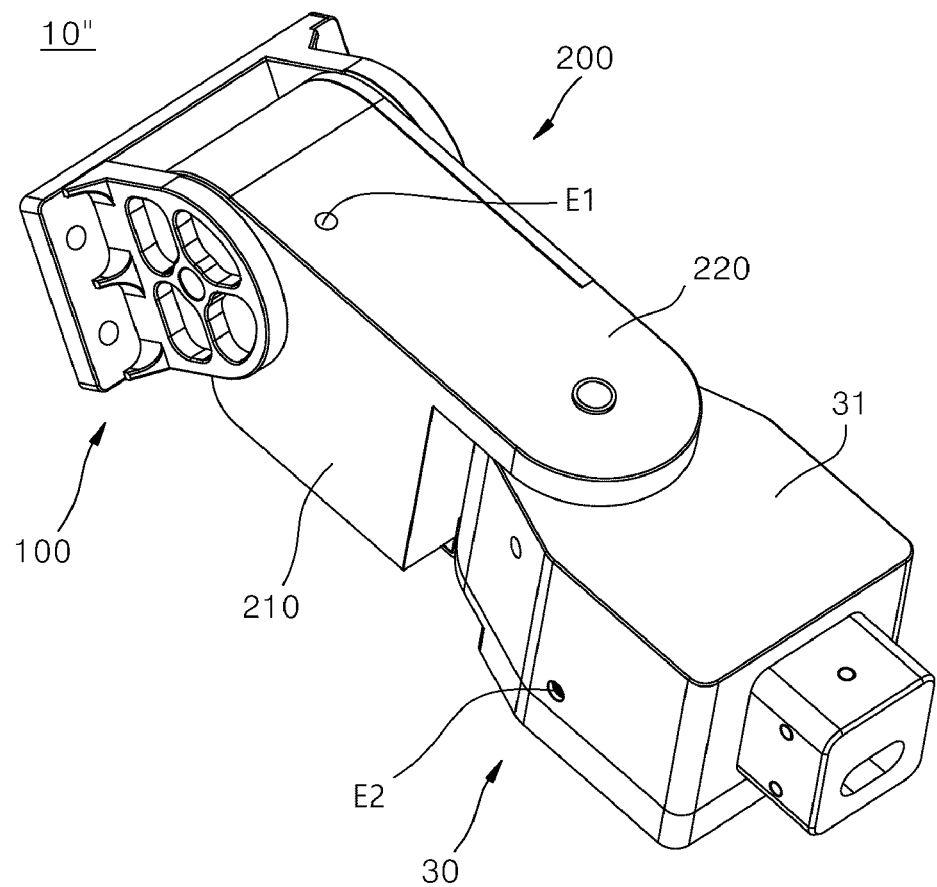
FIG. 8 is a perspective view illustrating yet another embodiment of an antenna clamping device according to the present disclosure.
Figure 9A:
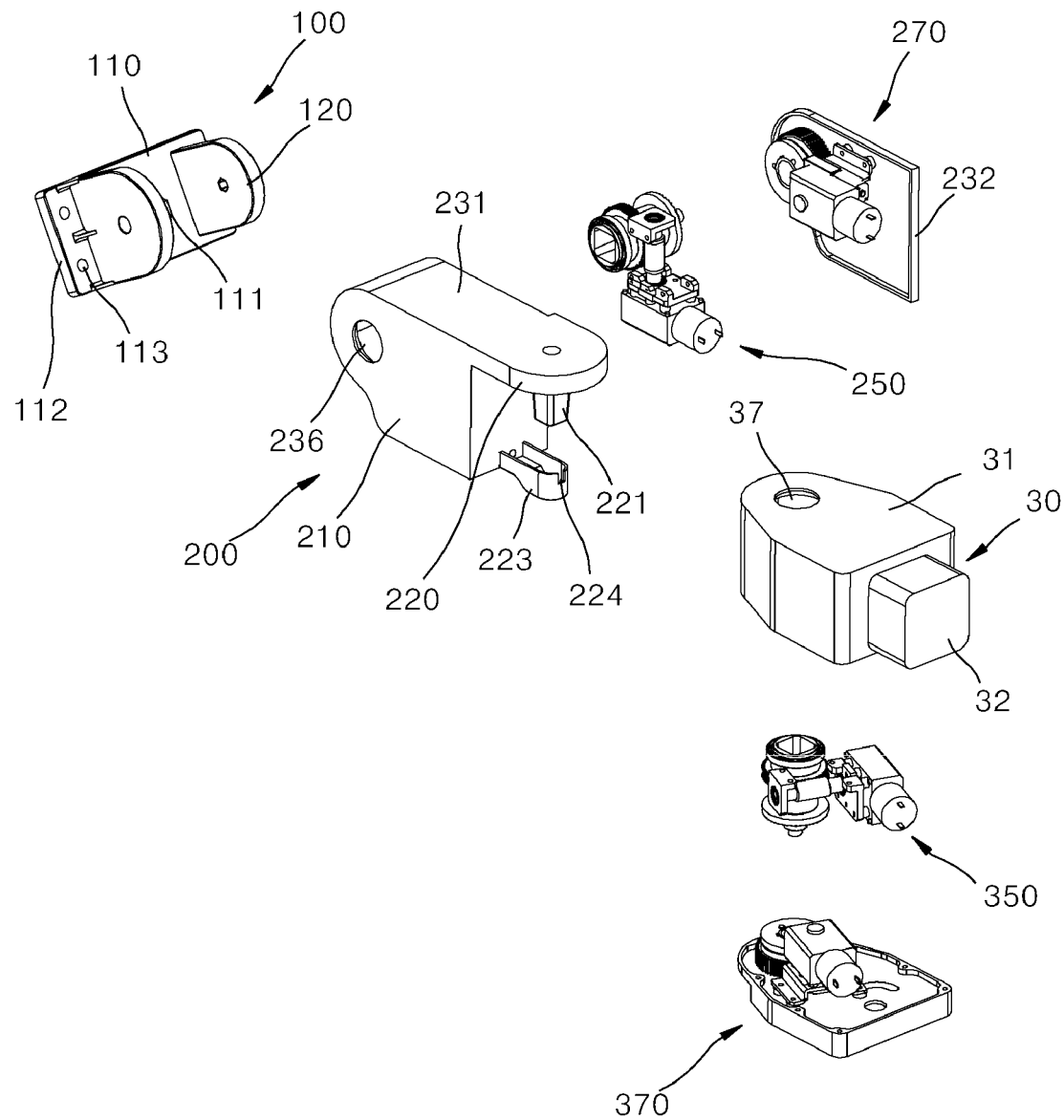
FIGS. 9A and 9B are a simplified exploded perspective view and a detailed exploded perspective view of FIG. 8.
Figure 9B:
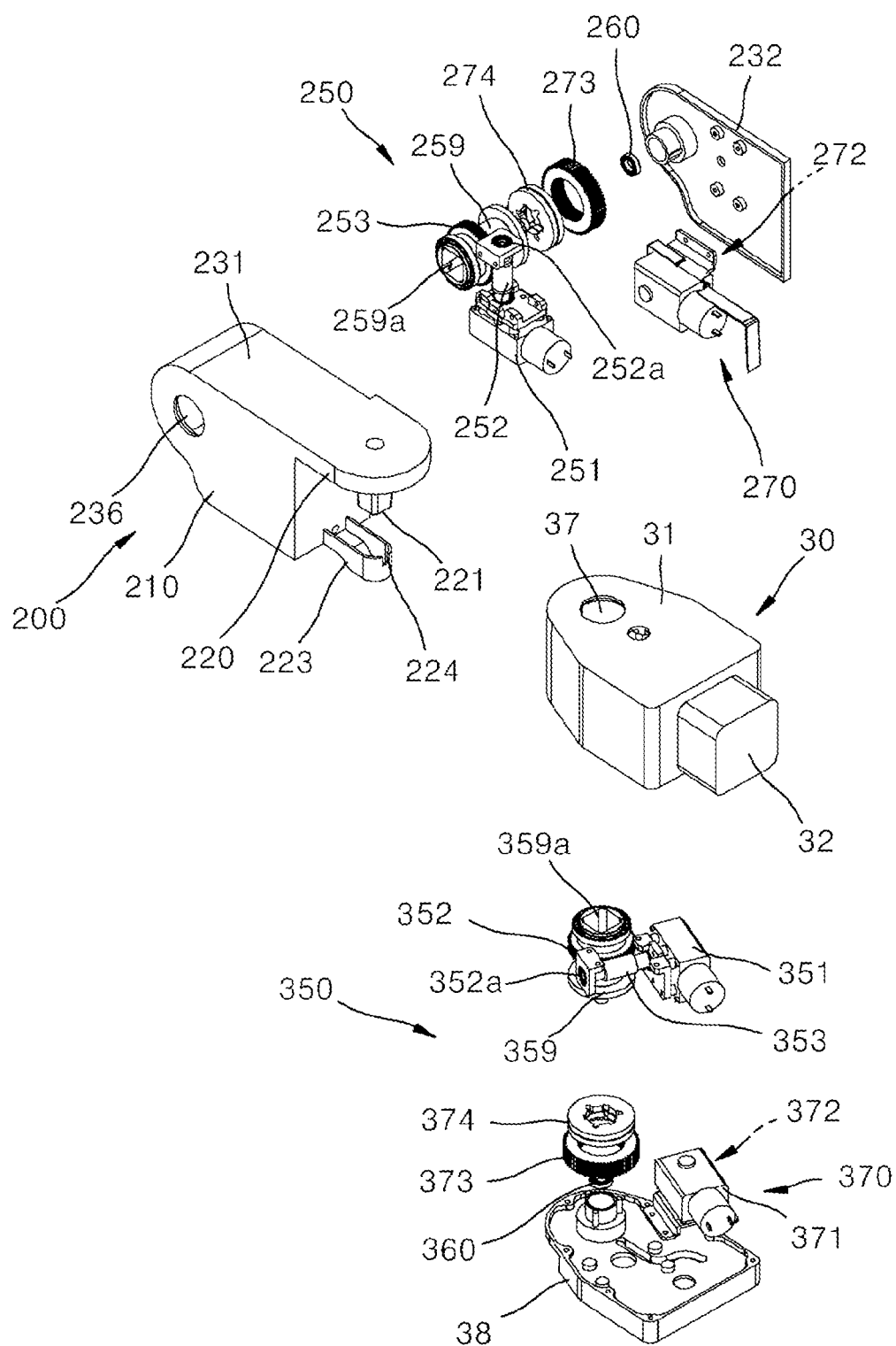
Figure 10A:
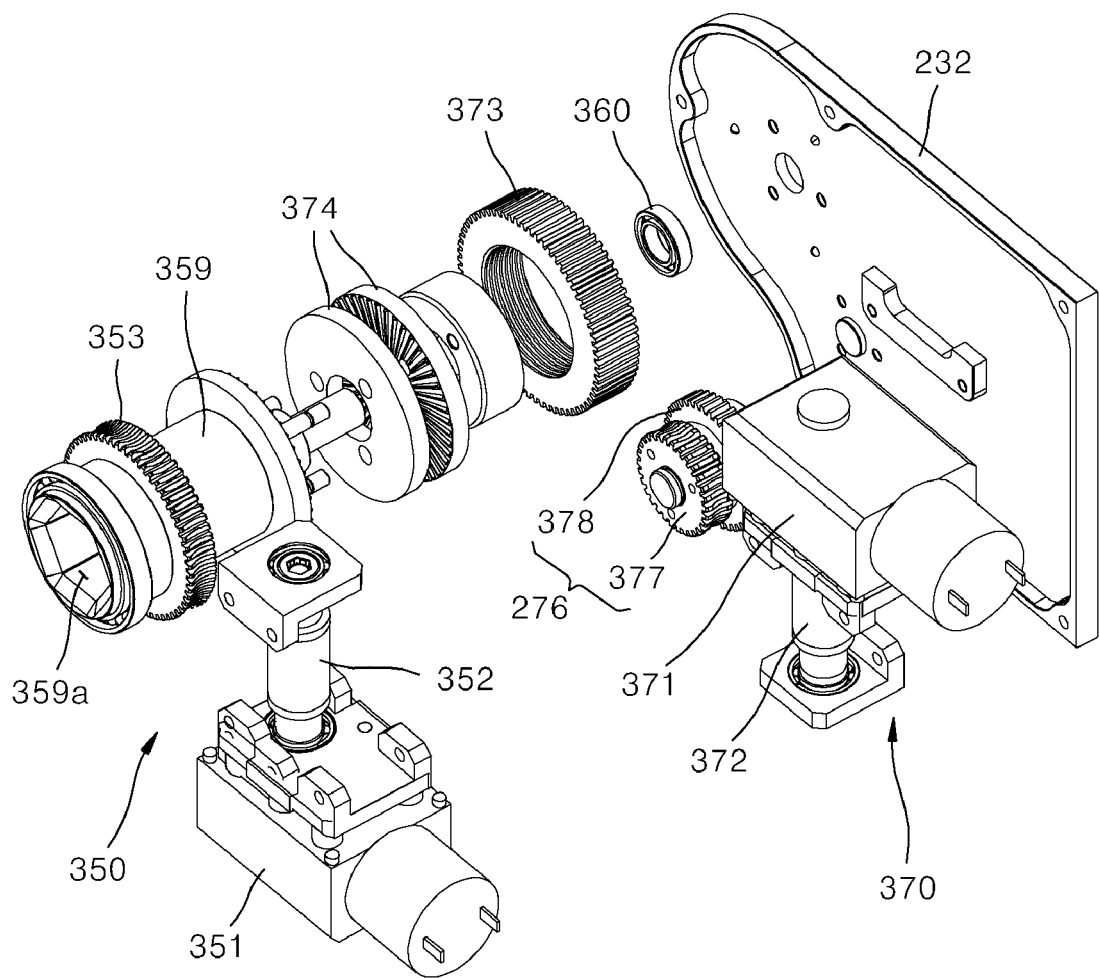
FIGS. 10A and 10B are exploded perspective views illustrating an example of an angular motion preventer of FIG. 8.
Figure 10B:
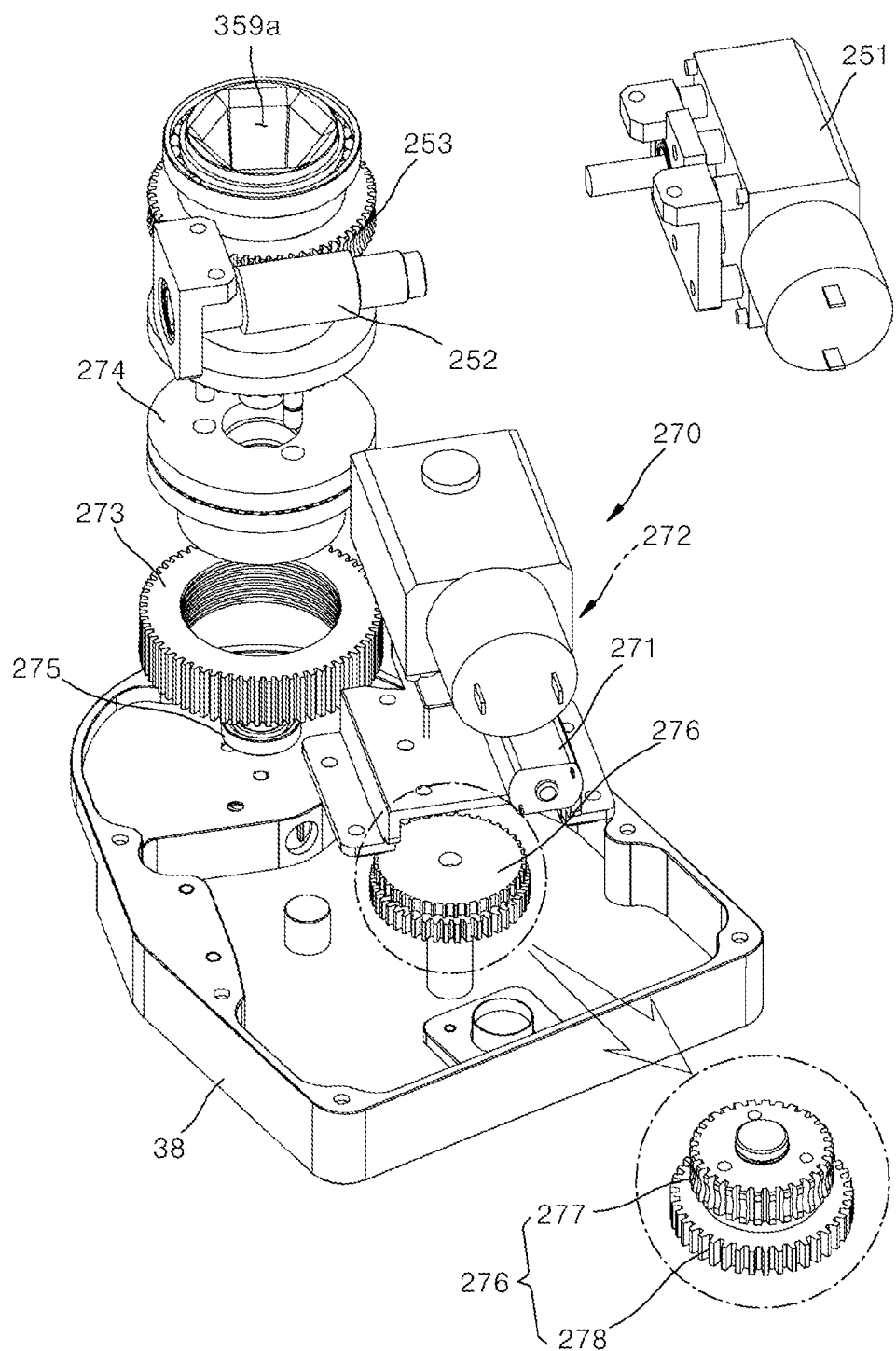

FIG. 8 is a perspective view illustrating yet another embodiment of an antenna clamping device according to the present disclosure. FIGS. 9A and 9B are a simplified exploded perspective view and a detailed exploded perspective view of FIG. 8. FIGS. 10A and 10B are exploded perspective views illustrating other examples of the rotating adjustment gear set and the tilting adjustment gear set of FIG. 8.

Referring to FIGS. 8 to 9B, yet another embodiment of an antenna clamping device 10" according to the present disclosure includes a rotation unit 200 that is coupled via a coupling unit 30 so as to be rotatable in a left-right direction, and a tilting unit 100 that is coupled to the rotation unit 200 so as to be tiltable in an up-down direction.

Here, referring to FIGS. 8 to 9B, yet another embodiment of an antenna clamping device 10" according to the present disclosure includes a rotating adjustment gear set 350 and a tilting adjustment gear set 250 serving as angular motion adjusters. All the angular motion adjusters 250 and 350 may be automatically driven by angular motion motors 251 and 351, both of which are electrically driven.

Furthermore, referring to FIGS. 9A and 9B, the antenna clamping device 10" according to yet another embodiment of the present disclosure may further include angular motion preventers 270 and 370 that are provided on at least any one of the rotation unit 200 and the tilting unit 100, and prevent a change in angle caused by vibrations or shocks due to an external force.

Here, referring to FIGS. 9A and 9B, the rotating adjustment gear set 350 and the tilting adjustment gear set 250 may be automatically driven by at least one angular motion motors 251 and 351 that are axially coupled with worms 252 and 352.

More specifically, referring to FIG. 9B, the rotating adjustment gear set 350 may include a rotating motor 351, a worm 352 that is axially rotated by the rotating motor 351, a worm wheel 353 that is provided to be meshed with the worm 352, and a rotating shaft 359 to which the worm wheel 353 is axially coupled.

Here, a shaft hole 359a, to which a rotating shaft 221 of the rotation unit 200 is axially coupled, is formed in a tip of the rotating shaft 359, and the rotating shaft 221 may be fitted into the shaft hole 359a and be rotated along with the rotating shaft 359.

The rotating adjustment gear set 350 is configured to rotate the rotating shaft 359 by meshing and rotation of the worm 352 and the worm wheel 353 according to a direction in which the rotating motor 351 is rotated and driven and to automatically rotate the rotating shaft 221 connected to the rotating shaft 359, and thereby can rotate the rotation unit 200 in a left-right direction.

Meanwhile, the tilting adjustment gear set 250 is identical to the rotating adjustment gear set 350 except only a tilting shaft 111 that is axially coupled with the rotating adjustment gear set 350. Thus, since the tilting adjustment gear set 250 has the same configuration and coupling relationship as the rotating adjustment gear set 350, specific description thereof will be omitted.

As described in one embodiment 10 and another embodiment 10' of the present disclosure, the angular motion preventers 270 and 370 may be provided as the rotating brake washer pad provided on the rotating surface of the rotation unit 200 and the tilting brake washer pad 129 provided on the tilting surface of the tilting unit 100.

However, in yet another embodiment 10" of the present disclosure, the angular motion preventers 270 and 370 may be provided as angular motion prevention gears 373 and 273 that mutually come into close contact with or separate a pair of rotating brake washer pads 374 or a pair of tilting brake washer pads 274 that are interposed on and axially rotated about the rotating shaft 359 and the tilting shaft 259 that mutually connect the rotating shaft 221 or the tilting shaft 111.

The angular motion prevention gears 373 and 273 may be driven by angular motion prevention motors 371 and 271 provided inside the coupling unit 30 and the rotation unit 200.

Here, referring to FIGS. 9A and 9B, the angular motion prevention motors 371 and 271 may be provided such that spur gears 372a and 272a (which are provided inside motor boxes and thus are denoted by a dotted leader line without being separately illustrated), which are directly coupled to motor shafts and axially rotated, are directly meshed with the angular motion prevention gears 373 and 273.

In this way, the angular motion preventers 370 and 270 prevent arbitrary motions of the tilting shaft 259 and the rotating shaft 359 using a mutual frictional force between the pair of tilting brake washer pads 274 in the case of the tilting unit 100 or using a mutual frictional force between the pair of rotating brake washer pads 374 in the case of the rotating unit 200, whereby the tilting unit 100 and the rotating unit 200 can be prevented from being damaged by weak vibrations caused by an external environment.

More specifically, in the case of the tilting unit 100, when the angular motion prevention motor 371 of the angular motion preventer 270 is electrically driven, the spur gear 372a provided inside the motor box is rotated and therey rotates the angular motion prevention gear 273 meshed therewith, and the angular motion prevention gear 273 is rotated on the tilting shaft 259, brings the pair of tilting brake washer pads 274 into close contact with each other, and generates a predetermined frictional force. In the state in which this frictional force is generated, even if weak vibrations are transmitted from the outside, arbitrary tilting can be prevented while continuously maintaining the gear meshing of the tilting adjustment gear set 250.

In the case of the rotation unit 200, likewise, the same function as the tilting unit 100 may be performed using the angular motion preventer 370. Specific description thereof will be replaced with the description of the angular motion preventer 270 of the tilting unit 100.

FIGS. 10A and 10B are exploded perspective views illustrating another example of an angular motion preventer of FIG. 8.

Referring to FIGS. 10A and 10B, the angular motion preventers 270 and 370 according to the present embodiment may be provided such that the worms 272 and 372 are coupled to motor shafts (not illustrated) provided inside the motor boxes and spur gears 276 and 376 are located between the worms 272 and 372 and the angular motion prevention gears 273 and 373 so as to serve as transmission gears.

The spur gears 276 and 376 may include first gears 278 and 378 meshed with the worms 272 and 372, and second gears 277 and 377 meshed with the angular motion prevention gears 273 and 373.

In the case of the present embodiment, in comparison with the case where only the spur gears 272a and 372a illustrated in FIGS. 9A and 9B exist, due to structure change of the worms 272 and 372 and the spur gears 276 and 376, a degree of design freedom for installation spaces in the rotation unit 200 and the coupling unit 30 can be increased. For example, in the case of the embodiment of FIGS. 9A and 9B in which the worms 272 and 372 are not provided, rotational shafts of the angular motion prevention motors 271 and 371 should be designed coaxially with rotational shafts of the spur gears 272a and 372a. However, as in FIGS. 10A and 10B, in the case of being replaced with the worms 272 and 372, as long as the worms 272 and 372 are meshed with the spur gears 276 and 376, lengths of the worms 272 and 372 are adjusted and applied, and thereby a degree of design freedom for fixing positions of the angular motion prevention motors 271 and 371 can be increased.

Meanwhile, referring to FIG. 10B, when the separate worms 272 and 372 are not provided, the 2-speed transmission gears 276 and 376 that are meshed with the spur gears 272a and 372a inside the motor boxes and are meshed with the angular motion prevention gears 273 and 373 are provided as described above, and rotation driving forces of the angular motion prevention motors 271 and 371 can be configured to be transmitted to the angular motion prevention gears 273 and 373 via the spur gears 272a and 372a and the 2-speed transmission gears 276 and 376.

The angular motion preventers 270 and 370 according to the present embodiment are also configured such that, when the angular motion prevention gears 273 and 373 are driven and rotated by the angular motion prevention motors 271 and 371, the pair of rotating brake washer pads 374 or the pair of tilting brake washer pads 274 come into close contact with each other, and a frictional force is increased, so that arbitrary angular motion caused by an external force can be prevented.

Meanwhile, in the antenna clamping device 10" according to yet another embodiment of the present disclosure which is described with reference to FIGS. 8 to 10B, the angular motion adjusters 250 and 350 and the angular motion preventers 270 and 370 require electrical driving of the angular motion motors 251 and 351 and the angular motion prevention motors 271 and 371, and thus the coupling unit 30 and the rotation unit 200 require mutual electrical connection of wires. To this end, a wire protection case 223 is separately provided at a lower end of the rotation unit 200, and the electrical connection of wires of the rotation unit 200 and the coupling unit 30 is possible through a wire coupling hole 224 formed in the wire protection case 223.

Undescribed reference numerals 260 and 360 indicate rotation support bearings that support rotation of the tilting shaft 259 and the rotating shaft 359 rotated about the tilting shaft 111 and the rotating shaft 221.

Meanwhile, in yet another embodiment 10" of the antenna clamping device according to the present disclosure which is descried with reference to FIG. 8, when the rotating adjustment gear set 350 and the tilting adjustment gear set 250 are not driven by the angular motion motors 351 and 251 (e.g., disconnection of the wires or a failure of the angular motion motors 351 and 251), emergency holes E1 and E2 may be further provided to make manual adjustment possible.

The emergency holes E1 and E2 may include a rotating emergency hole E1 that is provided such that a predetermined tool passes through and is coupled to a tool fixing hole 352a formed in an axial end of the worm 352 of the rotating adjustment gear set 350 provided on the coupling unit 30, and a tilting emergency hole E2 that is provided such that the above tool passes through and is coupled to a tool fixing hole 252a formed in an axial end of the worm 252 of the tilting adjustment gear set 250 provided on the rotation unit 200.

Furthermore, although not illustrated in the drawings, in the embodiment in which the worms 272 and 372 among the components of the angular motion preventers 270 and 370 are provided, emergency holes for releasing the mutual frictional force caused by the pair of rotating brake washer pads 374 or the pair of tilting brake washer pads 274 may also be provided.

Here, the tool has the same configuration as the tilting adjustment caps 301 and 302 or the rotating adjustment cap 303 as illustrated in FIGS. 4 and 5, and can be defined as being provided such that a worker easily carries the tool.

Figure 11:
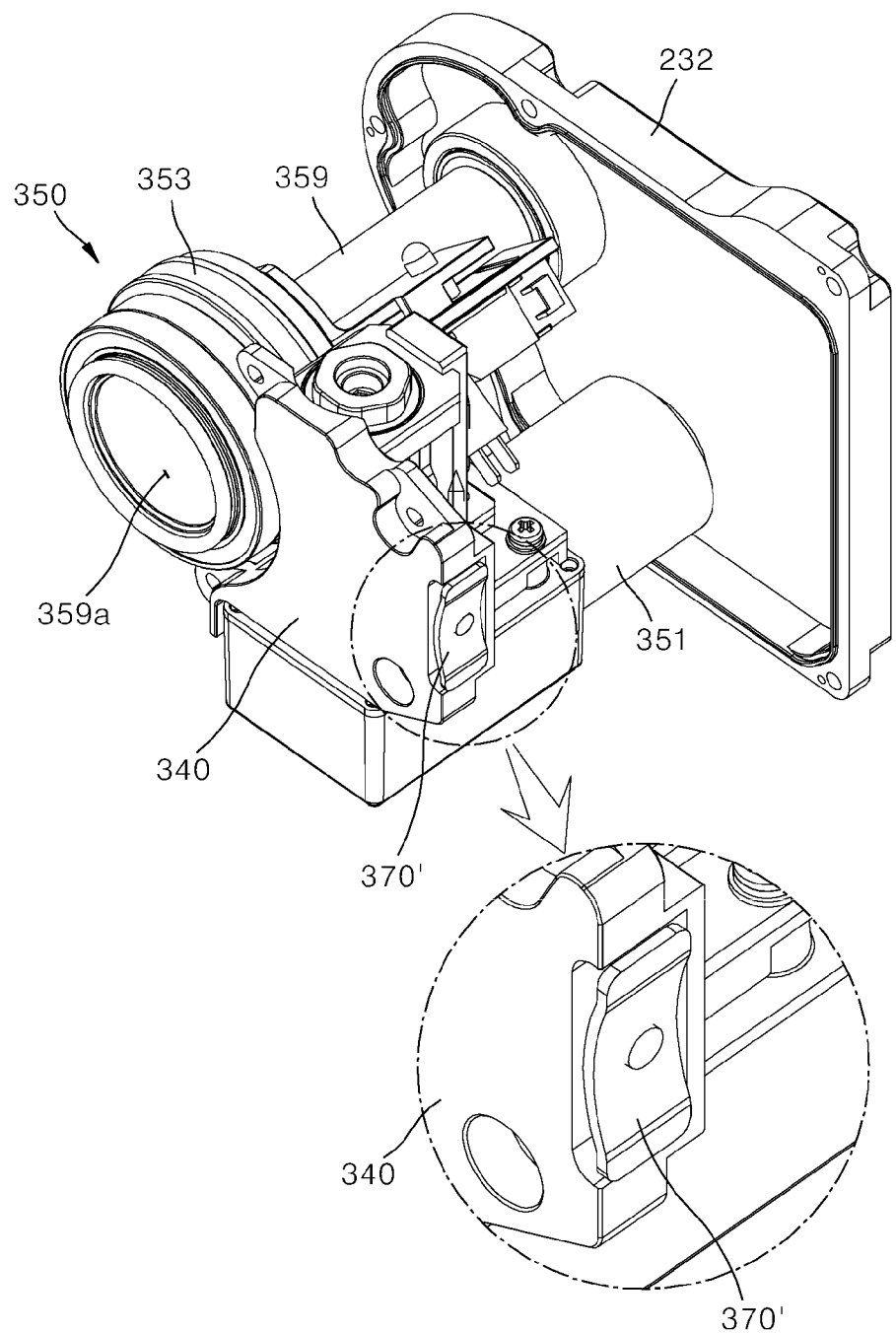
FIG. 11 is an internal perspective view illustrating an example of a tilting adjustment gear set of FIG. 8.
Figure 12:
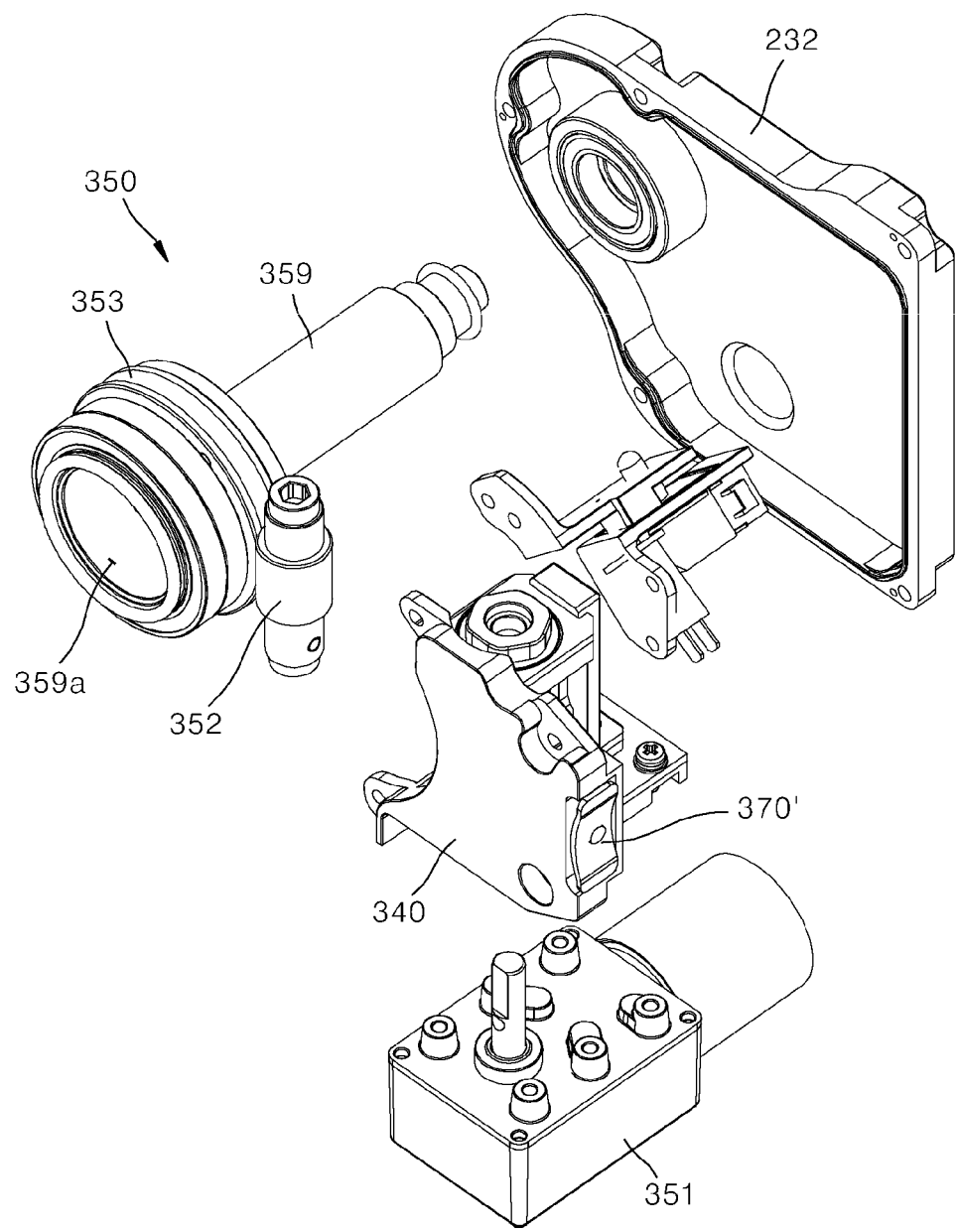
FIG. 12 is an exploded perspective view of FIG. 11.

FIG. 11 is an internal perspective view illustrating another example of the tilting adjustment gear set of FIG. 8. FIG. 12 is an exploded perspective view of FIG. 11, and FIG. 13 is a sectional view of FIG. 11.

Figure 13:
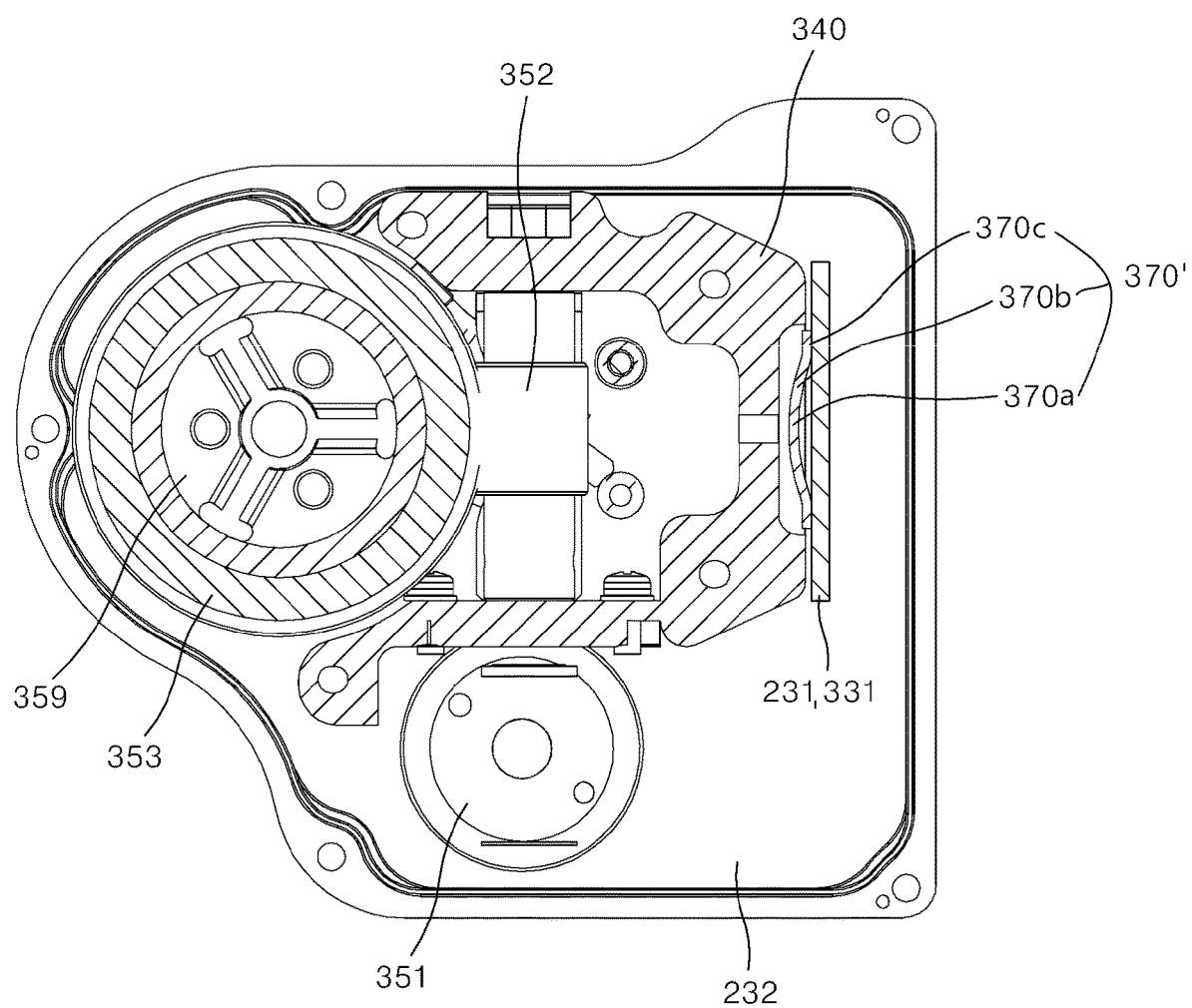
FIG. 13 is a sectional view of FIG. 11.

Referring to FIGS. 11 to 13, the embodiments 10, 10', and 10" of the antenna clamping device according to the present disclosure may further include a damper 370' as an alternative component of the above-described angular motion preventers 270 and 370.

For example, referring to FIGS. 11 to 13, the worm 352 and the worm wheel 353 of the tilting adjustment gear set 350 of the angular motion adjusters 250 and 350 have a meshing structure in which axes thereof are orthogonal to each other. Therefore, when weak vibrations caused by an external environment are transmitted, the axes are separated by a predetermined distance, and thereby the gear meshing is released. There is a chance that an arbitrary tilting motion occurs. As a configuration for preventing this, the angular motion preventers 270 and 370 based on the above-described gear meshing structure are suggested. However, in the present embodiment, the damper 370' with which the angular motion preventers 270 and 370 can be replaced in a simpler structure is disclosed.

More specifically, the damper 370' in the present embodiment may be disposed in at least any one of the rotating housing 231, the tilting housing 131, and the coupling housing 331 that form appearances of the rotation unit 200, the tilting unit 100, and the coupling unit 30, respectively.

In the present embodiment, description will be made on the assumption that, to prevent an arbitrary tilting motion of the tilting unit 100, the damper 370' is provided inside the coupling housing 331 of the coupling unit 30 in which the tilting adjustment gear set 350 of the tilting unit 100 is installed.

Referring to FIGS. 11 and 12, the damper 370' may be provided inside the coupling housing 331 in the shape of a leaf spring which is attached to an outer side of an installation bracket 340 on which the worm 352 of the tilting adjustment gear set 350 is installed, whose opposite ends come into close contact with a part of an inner surface of the coupling housing 331, and which elastically supports the entire installation bracket 340 toward the worm wheel 353.

More specifically, the damper 370' may include a fixing surface 370a that is fixed to an outer end of the installation bracket 340, bent surfaces 370b that are bent outward from the fixing surface 370a at a predetermined angle, and elastic support surfaces 370c that extend from the bent surfaces 370b and come into contact with a part of the inner surface of the coupling housing 331.

The bent surfaces 370b are bent from the fixing surface 370a so as to form an obtuse angle, and may be symmetrically provided on opposite ends of the fixing surface 370a. Moreover, the elastic support surfaces 370c extending from the bent surfaces 370b are preferably bent and formed at an angle corresponding to the contact part of the inner surface of the coupling housing 331.

In this way, the damper 370' shaped of a leaf spring continuously brings the installation bracket 340 into close contact with the worm wheel 353, thereby preventing the meshing between the worm 352 and the worm wheel 353 from being arbitrarily released, so that the separation caused by the above-described weak vibrations can be prevented.

An embodiment of the antenna clamping device according to the present disclosure has been described in detail with reference to the accompanying drawings. However, it goes without saying that embodiments of the present disclosure are not necessarily restricted by the embodiment described above and can be modified and carried out in an equivalent range by those skilled in the art to which the present disclosure pertains. Therefore, the scope of rights of the present disclosure will be defined by the following claims.

INDUSTRIAL APPLICABILITY

The present disclosure provides the antenna clamping device which can increase a degree of freedom of installation with respect to a single support pole having many spatial limitations and improve workability.

What is claimed is:

1. An antenna clamping device comprising:
   an arm unit that is coupled to a support pole and is partly provided to be movable in a horizontal direction;
   a coupling unit that is detachably mounted on a part of a tip of the arm unit;
   a rotation unit whose rear end is coupled to be rotatable relative to the coupling unit at a predetermined angle in a left-right direction; and
   a tilting unit that is coupled to a tip portion of the rotation unit so as to be tiltable in a top-down direction and mediates coupling of an antenna device,
   wherein an angular motion adjuster is provided on at least any one of the rotation unit and the tilting unit so as to adjust a rotating angle,
   wherein the antenna clamping device further comprises a damper provided on any one of the rotation unit, the tilting unit and the coupling unit on an outer circumferential surface of an installation bracket.

2. The antenna clamping device according to claim 1,
   wherein the angular motion adjuster comprises at least any one of:
   a rotating adjustment gear set that is provided on the rotation unit and adjusts a rotating angle of the left-right direction; and
   a tilting adjustment gear set that is provided on the tilting unit and adjusts a tilting angle of the up-down direction.

3. The antenna clamping device according to claim 2,
   wherein the angular motion adjuster comprises:
   a worm wheel which is rotably axially coupled with a rotating shaft of the rotation unit or a tilting shaft of the tilting unit and on an outer circumferential surface of which worm wheel gear teeth are formed; and
   a worm which is coupled orthogonal to the rotating shaft or the tilting shaft so as to rotate the worm wheel and on an outer circumferential surface of which worm gear teeth meshed with the worm wheel gear teeth are formed.

4. The antenna clamping device according to claim 3,
   wherein the worm is manually driven by at least one adjustment lever cap that is provided outside the rotation unit or the tilting unit and is axially coupled with the worm.

5. The antenna clamping device according to claim 3,
   wherein the worm is automatically driven by at least one angular motion motor that is provided inside the rotation unit or the tilting unit and is axially coupled with the worm.

6. The antenna clamping device according to claim 5,
   wherein the rotating adjustment gear set of the angular motion adjuster is installed inside any one of the coupling unit and the tilting unit, and
   wherein the tilting adjustment gear set of the angular motion adjuster is installed inside the other of the coupling unit and the tilting unit.

7. The antenna clamping device according to claim 5,
   wherein the coupling unit includes a tilting support block by which the tilting unit is supported, and an arm fastening block that extends from the tilting support block and is coupled to the arm unit,
   wherein the tilting unit includes a rotating support block by which the rotation unit is supported, and a tilting block that extends from the rotating support block and is tiltably coupled to the coupling unit;
   wherein the rotation unit includes an antenna coupling block to which the antenna device is coupled, and a rotating block that extends from the antenna coupling block and is rotatably coupled to the tilting unit;
   wherein the rotating adjustment gear set of the angular motion adjuster is installed in an installation space of the rotating support block, and
   wherein the tilting adjustment gear set of the angular motion adjuster is installed in an installation space of the tilting support block.

8. The antenna clamping device according to claim 3,
   further comprising angular motion preventers that are provided on the rotation unit and the tilting unit and prevent a change in angle due to vibrations or shocks caused by an external force.

9. The antenna clamping device according to claim 8,
   wherein the angular motion preventers are provided as a rotating brake washer pad provided on a rotating surface of the rotation unit and a tilting brake washer pad provided on a tilting surface of the tilting unit.

10. The antenna clamping device according to claim 8,
    wherein the angular motion preventers are provided as a pair of rotating brake washer pads interposed on the rotating shaft inside the rotation unit and a pair of tilting brake washer pads interposed on the tilting shaft inside the tilting unit.

11. The antenna clamping device according to claim 10,
    wherein the coupling unit includes a tilting support block by which the tilting unit is supported, and an arm fastening block that extends from the tilting support block and is coupled to the arm unit,
    wherein the tilting unit includes a rotating support block by which the rotation unit is supported, and a tilting block that extends from the rotating support block and is tiltably coupled to the coupling unit;
    wherein the rotation unit includes an antenna coupling block to which the antenna device is coupled, and a rotating block that extends from the antenna coupling block and is rotatably coupled to the tilting unit;
    wherein the pair of rotating brake washer pads are interposed on the rotating shaft that is provided in an installation space of the rotating support block, and
    wherein the pair of tilting brake washer pads are interposed on the rotating shaft that is provided in an installation space of the tilting support block.

12. The antenna clamping device according to claim 10,
    wherein the angular motion preventers further comprise:
    angular motion prevention gears that are interposed on the rotating shaft or the tilting shaft, are provided to enable axial rotation, and bring the pair of rotating brake washer pads and the pair of tilting brake washer pads into close contact with each other or separate them from each other; and
    angular motion prevention motors that rotate the angular motion prevention gears.

13. The antenna clamping device according to claim 3,
    wherein the damper is provided on the outer circumferential surface of the installation bracket on which the worm is installed in a shape of a leaf spring so as to prevent meshing of the worm with the worm wheel from being released due to vibrations or shocks caused by an external force, and elastically supports the installation bracket.

14. The antenna clamping device according to claim 13, wherein the damper is elastically supported on a part of an inner surface of any one of a rotating housing, a tilting housing, and a coupling housing that form appearances of the rotation unit, the tilting unit, and the coupling unit.

15. The antenna clamping device according to claim 13, wherein the damper comprises:
a fixing surface that is fixed to the outer circumferential surface of the installation bracket;
bent surfaces that are bent outward from the fixing surface at a predetermined angle; and
elastic support surfaces that extend from the bent surfaces and come into contact with a part of an inner surface of a rotating housing, a tilting housing, a coupling housing that form appearances of the rotation unit, the tilting unit, and the coupling unit.

\* \* \* \* \*